(12) United States Patent
Hebb et al.

(10) Patent No.: US 12,491,373 B2
(45) Date of Patent: Dec. 9, 2025

(54) PLANNING AND DELIVERY OF DYNAMICALLY ORIENTED ELECTRIC FIELD FOR BIOMEDICAL APPLICATIONS

(71) Applicant: LONDON HEALTH SCIENCES CENTRE RESEARCH INC., London (CA)

(72) Inventors: Matthew Hebb, London (CA); Susanne Schmid, London (CA); Eugene Wong, London (CA); Terry Peters, London (CA); Erin Iredale, St. Marys (CA)

(73) Assignee: London Health Sciences Centre Research Inc., London (CA)

( * ) Notice: Subject to any disclaimer, the term of this patent is extended or adjusted under 35 U.S.C. 154(b) by 566 days.

(21) Appl. No.: 17/793,495

(22) PCT Filed: Jan. 16, 2021

(86) PCT No.: PCT/CA2021/050044
§ 371 (c)(1),
(2) Date: Jul. 18, 2022

(87) PCT Pub. No.: WO2021/142549
PCT Pub. Date: Jul. 22, 2021

(65) Prior Publication Data
US 2023/0045652 A1 Feb. 9, 2023

Related U.S. Application Data

(60) Provisional application No. 62/962,553, filed on Jan. 17, 2020.

(51) Int. Cl.
*A61N 1/40* (2006.01)
*A61B 5/055* (2006.01)

(52) U.S. Cl.
CPC ............... *A61N 1/40* (2013.01); *A61B 5/055* (2013.01)

(58) Field of Classification Search
CPC .................................. A61N 1/40; A61B 5/055
See application file for complete search history.

(56) References Cited

U.S. PATENT DOCUMENTS 4,612,934 A * 9/1986 Borkan .............. A61N 1/36185
607/42
7,616,998 B2 * 11/2009 Nuttin ................ A61N 1/36082
607/45

(Continued)

FOREIGN PATENT DOCUMENTS

WO 2016/090239 6/2016

OTHER PUBLICATIONS

Dmochowski, J.P., et al., Optimized multi-electrode stimulation increases focality and intensity at target, Journal of Neural Engineering, Jun. 2011, V. 8, 1-16.

(Continued)

*Primary Examiner* — Michael J Lau
(74) *Attorney, Agent, or Firm* — Eduardo Krupnik

(57) ABSTRACT

Methods, systems and non-transitory computer readable storage media of electric field treatment planning of a target tissue. A method of electric field treatment planning of a target tissue site includes: (a) obtaining an image of the target tissue site, (b) determining volume and one or more electric properties of the target tissue site, (c) using the volume and the one or more electric properties to: (i) determine a number of electrodes to treat the target tissue site with electric fields, each electrode having one or more contacts, (ii) determine a placement of the number of electrodes within the target tissue site, and (iii) relative to one of the contacts in one of the number of electrodes at the placement determined in (ii), determine an electric field that (Continued)

results in a prescribed electric field coverage of the target tissue site.

15 Claims, 20 Drawing Sheets

(56) References Cited

U.S. PATENT DOCUMENTS

| | | | | |
|---|---|---|---|---|
| 8,027,738 | B2* | 9/2011 | Palti | A61N 1/18 607/121 |
| 8,914,117 | B2* | 12/2014 | Valente | A61N 1/36082 607/45 |
| 10,537,741 | B2* | 1/2020 | Bradley | A61N 1/36132 |
| 2005/0209642 | A1* | 9/2005 | Palti | A61N 1/326 607/2 |
| 2011/0196455 | A1* | 8/2011 | Sieracki | A61N 1/37247 607/62 |
| 2017/0072198 | A1* | 3/2017 | Makous | A61N 1/36064 |
| 2018/0001078 | A1* | 1/2018 | Kirson | A61N 1/044 |
| 2018/0160933 | A1* | 6/2018 | Urman | G16H 50/50 |
| 2019/0133683 | A1* | 5/2019 | Matloubian | A61B 18/18 |
| 2019/0308016 | A1* | 10/2019 | Wenger | G01R 33/5607 |

OTHER PUBLICATIONS

Valle, G. and Micera, S., Modeling to Guide Implantable Electrode Design, River Publishers Series in Biomedical Engineering, Chapter 4, Dec. 2019.

International Search Report and Written Opinion of the International Searching Authority, PCT/CA2021/050044, Mar. 31, 2021.

Xu, H., Bihari F, Whitehead S, et al. In vitro validation of intratumoral modulation therapy for glioblastoma. Anticancer Res. 2016; 36: 71-80.

Di Sebastiano AR, Deweyert A, Benoit S, et al. Preclinical outcomes of intratumoral modulation therapy for glioblastoma. Sci. Rep. 2018; 8(1):7301.

Deweyert A, Iredale E, Xu Hu, et al. Diffuse intrinsic pontine glioma cells are vulnerable to low intensity electric fields delivered by intratumoral modulation therapy. J Neurooncol. 2019; 143: 49-56.

Iredale E, Deweyert A, Hoover DA, et al. Optimization of multi-electrode implant configurations and programming for the delivery of non-ablative electric fields in intratumoral modulation therapy. Med Phys. 2020; 47(11):5441-5454.

Parkins KM, Dubois VP, Kelly JJ, et al. Engineering circulating tumor cells as novel cancer theranostics. Theranostics. 2020; 10(17): 7925-7937.

Hamilton A, Foster PJ, Ronald JA. Evaluating non-integrating lentiviruses as safe vectors for noninvasive reporter-based molecular imaging of multipotent mesenchymal stem cells. Hum Gene Ther. 2018; 9(10): 1213-1225. Abstract.

Ghiaseddin AP, Shin D, Melnick K, et al. Tumor treating fields in the management of patients with high grade gliomas. Curr. Treat. Options in Oncol. 2020; 21: 76.

Arnold WM, Fuhr G. Increasing the permittivity and conductivity of cellular electromanipulation media [abstract]. Proceedings of 1994 IEEE Industry Applications Society Annual Meeting. 1994; 2:1470-1476.

Chen MT, Jiang C, Vernier PT, et al. Two-dimensional nanosecond electric field mapping based on cell electropermeabilization. PMC Biophys. 2009; 2(1): 9.

Latikka J, Eskola H. The resistivity of human brain tumours in vivo. Ann Biomed Eng. 2019; 47(3): 706-713.

Palti Y. Stimulation of internal organs by means of external applied electrodes. J. Appl. Physiol. 1966; 21: 1619-1623.

Taghian T. 2015. Thesis. Interaction of an electric field with vascular cells. Avaliable at https://etd.ohiolink.edu/.

Gabriel, C., et al. "Electrical conductivity of tissue at frequencies below 1 MHz," Phys. Med. Biol., vol. 54, No. 16, pp. 4863-4878, Aug. 2009.

Latikka, J., et al. "Conductivity of living intracranial tissues.," Phys. Med. Biol., vol. 46, No. 6, pp. 1611-1616, Jun. 2001.

Stoy, R.D., et al. "Dielectric properties of mammalian tissues from 0.1 to 100 MHz: a summary of recent data," 1982 Phys. Med. Biol. vol. 27, p. 501.

De Giorgi, U., et al., "Circulating Tumor Cells and [ 18 F]Fluorodeoxyglucose Positron Emission Tomography/Computed Tomography for Outcome Prediction in Metastatic Breast Cancer," J. Clin. Oncol., vol. 27, No. 20, pp. 3303-3311, Jul. 2009.

Wenger, C., et al. "The electric field distribution in the brain during TTFields therapy and its dependence on tissue dielectric properties and anatomy: A computational study," Phys. Med. Biol., vol. 60, No. 18, pp. 7339-7357, 2015.

Wenger, C., et al. "Improving Tumor Treating Fields Treatment Efficacy in Patients With Glioblastoma Using Personalized Array Layouts," Int. J. Radiat. Oncol., vol. 94, No. 5, pp. 1137-1143, Apr. 2016.

Amon, A. and Alesch, F. "Systems for deep brain stimulation: review of technical features," J. Neural Transm., vol. 124, No. 9, pp. 1083-1091, Sep. 2017.

Anderson, D.N., et al. "Optimized programming algorithm for cylindrical and directional deep brain stimulation electrodes," J. Neural Eng., vol. 15, No. 2, p. 026005, Apr. 2018.

Butson, C.R. and McIntyre, C.C. "Role of electrode design on the volume of tissue activated during deep brain stimulation.," J. Neural Eng., vol. 3, No. 1, pp. 1-8, Mar. 2006.

Alonso, F., et al. "Investigation into Deep Brain Stimulation Lead Designs: A Patient-Specific Simulation Study.," Brain Sci., vol. 6, No. 3, p. 39, Sep. 2016.

Amaran, S., et al. "Simulation optimization: a review of algorithms and applications," Ann. Oper. Res., vol. 240, No. 1, pp. 351-380, May 2016.

Morgan-Fletcher, S.L. "Prescribing, Recording and Reporting Photon Beam Therapy (Supplement to ICRU Report 50), CRU Report 62 . ICRU, pp. ix+52, 1999 (ICRU Bethesda, MD) $65.00 ISBN 0-913394-61-0," Br. J. Radiol., vol. 74, No. 879, pp. 294-294, Mar. 2001.

* cited by examiner

 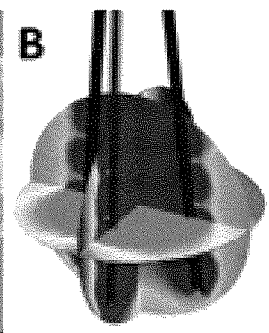 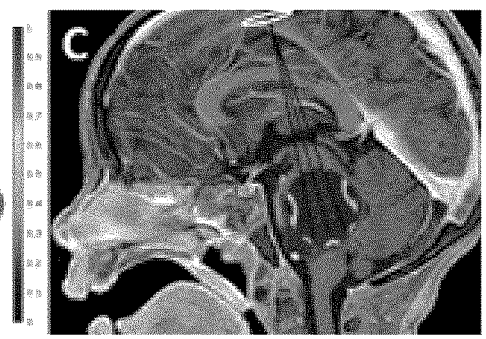
Fig. 14A Fig. 14B Fig. 14C
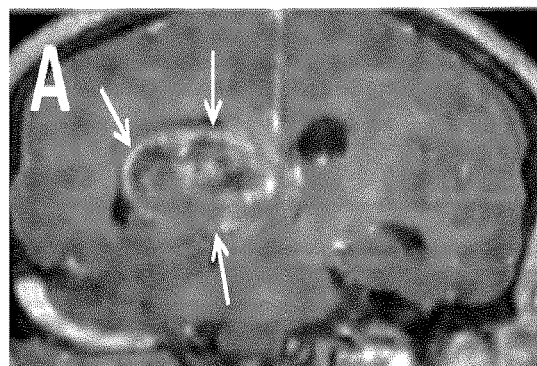 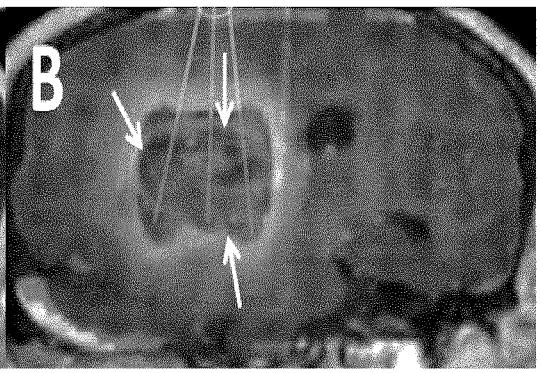
Fig. 15A Fig. 15B

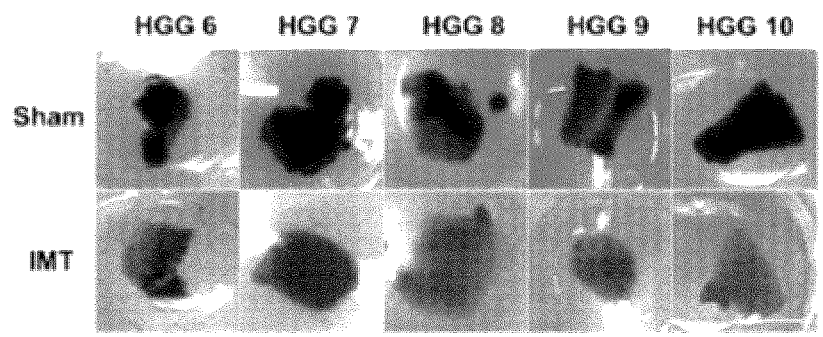
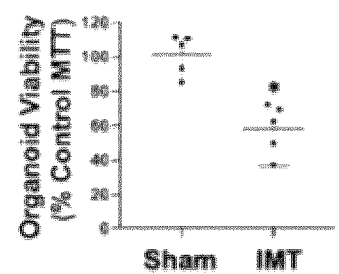
Fig. 23A
Fig. 23B
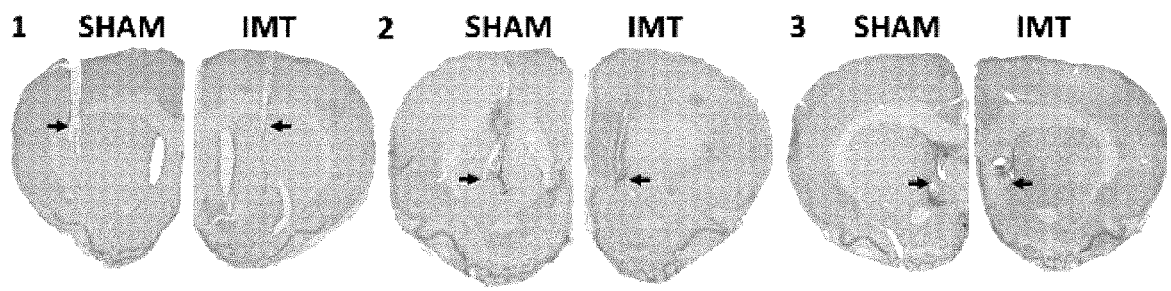
Fig. 24

PLANNING AND DELIVERY OF DYNAMICALLY ORIENTED ELECTRIC FIELD FOR BIOMEDICAL APPLICATIONS

CROSS REFERENCE TO RELATED APPLICATIONS

This application is a national stage application under 35 U.S.C. 371 of International Application No. PCT/CA2021/050044, filed Jan. 16, 2021, which in turn claims the benefit under 35 U.S.C. 119 (e) of U.S. Provisional Ser. No. 62/962,553, filed Jan. 17, 2020, the contents of each of which are hereby incorporated by reference into the present disclosure.

FIELD OF THE INVENTION

The present disclosure relates to the use of non-static or dynamically oriented electric fields for the treatment of medical disorders. More specifically, the present disclosure relates to the planning of treatment and treatment of tumors, cancer and other medical conditions by delivering in situ electrical stimulation.

BACKGROUND OF THE INVENTION

Intratumoral modulation therapy (IMT) is an electrotherapeutic innovation to optimally exploit electrosensitivity of tumors located in the central nervous system (CNS, [1]-[3]).

Previous studies demonstrated the efficacy of low intensity, non-ablative IMT fields against tumor cells, such as glioblastoma (GBM) cells, without affecting post-mitotic, normal neurons. IMT also incited a potent cooperative response with adjuvant chemotherapy, radiation or gene therapy [1], [3]. An in vivo IMT allograft model used non-ablative, non-entraining parameters to treat GBM in the rat while avoiding adverse neurological effects [2]. A rudimentary system of a single 1-mm bioelectrode positioned within aggressive GBM tumors using a sinusoidal IMT waveform set at 2V (safely used in neuromodulation) and 200 kHz (above neuronal entrainment range) produced smaller tumors in the majority (80%) of animals relative to sham controls. Field simulation studies showed that the pilot IMT system produced this significant GBM volume reduction despite actually reaching only about 25% of the tumor tissue. This seminal study provided the first evidence that an implantable electrotherapy could yield GBM control and suggested even greater benefits may be produced by comprehensive IMT coverage [2]. These seminal studies were done using a rudimentary system having a single bioelectrode that was subsequently found to be limited by inadequate spatial coverage and associated constraints on tumor control. We have shown that a single stimulating electrode with a peripheral ground source used for IMT can only deliver focal therapeutic electric fields that inadequately cover large tumors [1]-[3]. Each electrode used in these studies had set anode and cathode designations and produced IMT fields that do not migrate, rotate or exhibit dynamic orientation.

It becomes apparent, therefore, that multiple bioelectrodes may be necessary to fully cover large tissue areas or tumors, including tissue areas and tumors of the CNS. However, placing a minimum number of electrodes with set anode and cathode designations that produce sufficient static or non-rotational or non-dynamic IMT fields to cover a target tissue is not trivial. Depending on the number of electrodes placed, their placement within the tissue, and electrical parameters use, the field generated by the electrodes may cancel each other and may create "cold spots" within the IMT fields (i.e. regions of the tissue that are unaffected by the IMT).

Therefore the challenge remains to determine, for each particular tissue target site, including a tumor, to be treated, the optimal minimized number of electrodes, optimal position within the target tissue site to place them and the optimal stimulation parameters to treat the particular tumor while avoiding "cold spots." [It should be noted that even though we used the term "stimulation parameters", in the case of a tumor or neoplasm the electrical parameters are meant to control tumor or neoplasm growth by preventing cell proliferation].

SUMMARY OF THE INVENTION

The present disclosure aims to extend the distribution of therapeutic-range electric fields across tissue volumes using multiple electrodes rather than a single stimulation source. The present disclosure provides for methods and systems for determining the maximum tissue volumes attainable with a minimized number of electrodes in a multi-electrode configuration and their placements and optimization of stimulation parameters for maximal safe effect.

In one embodiment, the present disclosure relates to a method of electric field treatment planning of a target tissue site, the method comprising: (a) obtaining an image of the target tissue site, (b) determining volume and one or more electric properties of the target tissue site, (c) using the volume and the one or more electric properties of the target tissue site to: (i) determine a number of electrodes to treat the target tissue site with electric fields, the number of electrodes being one or more than one electrodes, each electrode having one or more contacts, (ii) determine a placement of the number of electrodes determined in (i) within the target tissue site, and (iii) relative to one of the contacts in one of the number of electrodes determined in (i) at the placement determined in (ii), determine an electric field that results in a prescribed electric field coverage of the target tissue site.

In one embodiment of the method of electric field treatment planning of a target tissue site, step (a) further comprises obtaining an image of tissue surrounding the target tissue site ("surrounding tissue"), step (b) further comprises determining volume and one or more electric properties of the surrounding tissue, and wherein step (c) further comprises using the volume and the one or more electric properties of the surrounding tissue to determine (i), (ii) and (iii) that results in a prescribed electric field coverage of the target tissue site while minimizes the volume of the surrounding tissue receiving the prescribed electric field.

In one embodiment of the method of electric field treatment planning of a target tissue site, the method further comprises (d) obtaining another image of the target tissue to visualize an actual position of the electrodes relative to the target tissue site, (e) using the image of (d) to assess the prescribed electric field coverage of the target tissue site, and (f) repeat steps (b) to (e) to optimize the prescribed electric field coverage based on the assessment in (e).

In one embodiment of the method of electric field treatment planning of a target tissue site, step (c) further includes determining the trajectory angle of the number of electrodes determined in step (c)(i).

In one embodiment of the method of electric field treatment planning of a target tissue site, the electrodes are implantable electrodes.

In one embodiment of the method of electric field treatment planning of a target tissue site, the target tissue site is non-neoplastic tissue. Non-neoplastic tissue include, without limitation, skin, muscle, nerves, spinal cord, brain and other organs.

In one embodiment of the method of electric field treatment planning of a target tissue site, the target tissue site is a tumor or neoplasm.

In one embodiment of the method of electric field treatment planning of a target tissue site, the prescribed electric field is 1 V/cm.

In one embodiment of the method of electric field treatment planning of a target tissue site, the method further comprises the step of treating the target tissue with the placed number of electrodes using the determined electric field.

In one embodiment of the method of electric field treatment planning of a target tissue site, the electric filed is a dynamically oriented electric filed.

In one embodiment of the method of electric field treatment planning of a target tissue site, the dynamically oriented electric field is a relative phase shift.

In another embodiment, the present disclosure provides a system for electric fields treatment of a target tissue site comprising: a generator for generating electrical field parameters, and at least one data processor, wherein the data processor includes instructions to: (a) receive data relating to a volume and one or more electric properties of the target tissue site, (b) using the data relating to the volume and the one or more electric properties of the target tissue site to: (i) determine a number of electrodes to treat the target tissue site with electrical field, the number of electrodes being one or more than one electrodes, each electrode having one or more contacts, (ii) determine a placement of the number of electrodes determined in (i) within the target tissue site, and (iii) relative to one of the one or more contacts in one of the number of electrodes at the placement determined in (ii), determine an electric field that results in a prescribed electric field coverage of the target tissue site.

In one embodiment of the system for electric fields treatment of a target tissue site, instruction (a) further comprises receiving data relating to volume and electric properties of tissue surrounding the target tissue site ("surrounding tissue"), instruction (b) further comprises determining volume and one or more electric properties of the surrounding tissue, and wherein instruction (c) further comprises using the volume and the one or more electric properties of the surrounding tissue to determine items (b)(i), (b)(ii) and (b)(iii) that results in a prescribed electric field coverage of the target tissue site while minimizes the volume of the surrounding tissue receiving the prescribed electric field.

In one embodiment of the system for electric fields treatment of a target tissue site, the data processor further includes instructions to (d) receive data relating to one or more electric properties of the target tissue having information of an actual position of the electrodes relative to the target tissue site, (e) using the data of (d) to assess the prescribed electric field coverage of the target tissue site, and (f) repeat steps (b) to (e) to optimize the prescribed electric field coverage based on the assessment in (e).

In one embodiment of the system for electric fields treatment of a target tissue site, the instructions further include instructions to determine the trajectory angle of the number of electrodes determined in step (b)(i).

In one embodiment of the system for electric fields treatment of a target tissue site, the electrodes are implantable electrodes.

In one embodiment of the system for electric fields treatment of a target tissue site, the electric field is a dynamically oriented electric filed.

In one embodiment of the system for electric fields treatment of a target tissue site, the dynamically oriented electric field is a relative phase shift.

In another embodiment, the present disclosure provides for a non-transitory computer readable storage medium, wherein code embodied in the computer readable storage medium executed by at least one processor performs operations, the operations including: (a) receiving, by at least one data processor, data relating to volume and one or more electric properties of the target tissue site, (b) using the data relating to the volume and the one or more electric properties of the target tissue site to: (i) determine a number of electrodes to treat the target tissue site with electric fields, the number of electrodes being one or more than one electrodes, each electrode having one or more contacts (ii) determine a placement of the number of electrodes determined in (i) within the target tissue site, and (iii) relative to one of the one or more contacts in one of the number of electrodes at the placement determined in (ii), number of electrodes at the placement within the target tissue site, determine an field that results in a prescribed electric field coverage of the target tissue site.

In one embodiment of the non-transitory computer readable storage medium, operation (a) further comprises receiving data relating to volume and one or more electric properties of tissue surrounding the target tissue site ("surrounding tissue"), operation (b) further comprises using the volume and the one or more electric properties of the surrounding tissue to determine (i), (ii) and (iii) that results in a prescribed electric field coverage of the target tissue site while minimizes the volume of the surrounding tissue receiving the prescribed electric field.

In one embodiment of the non-transitory computer readable storage medium, the operations further include (c) receive data relating to one or more electric properties of the target tissue having information of an actual position of the electrodes relative to the target tissue site, (d) use the data of (c) to assess the prescribed electric field coverage of the target tissue site, and (e) repeat steps (b) to (d) to optimize the prescribed electric field coverage based on the assessment in (d).

In one embodiment of the non-transitory computer readable storage medium, the operations further include determining the trajectory angle of the number of electrodes determined in step (b)(i).

In one embodiment of the non-transitory computer readable storage medium, the electrodes are implantable electrodes.

In one embodiment of the non-transitory computer readable storage medium, the electric filed is a dynamically oriented electric filed.

In one embodiment of the non-transitory computer readable storage medium, the dynamically oriented electric field is a relative phase shift.

In another embodiment, the present disclosure relates to a use of the system according to any of the previous embodiments for the treatment of a target tissue. In aspects of this embodiment, the target tissue site is non-neoplastic tissue, including but not limited to skin, muscle, nerves, spinal cord, brain and other organs. In aspects the target tissue site is a tumor or neoplasm.

BRIEF DESCRIPTION OF THE DRAWINGS

The following figures illustrate various aspects and preferred and alternative embodiments of the disclosure.

FIG. 14. FIG. 14A: MRI plan with IMT leads guided through a burrhole (white circle at top) into a brainstem HGG (arrow). Other trajectories are possible, as guided by tumor anatomy. 14B: Pre-treatment simulation to calculate optimal field parameters. 14C: IMT field spanning the tumor to provide sustained, titratable therapy.

FIG. 15. 15A: coronal MRI of brain. 15B: Coronal MRI of human brain of 15A overlaid with dynamic IMT fields.

FIG. 23. Patient GBM organoids are highly sensitive to dynamically-oriented electric fields HGG organoids, all diagnosed as GBM, were created from patient tumor specimens immediately following surgical resection. 23A: Representative photographs depicting 5 GBM organoid cultures exposed to MTT following sham or dynamic field IMT conditions. 23B: Quantification of GBM organoid viability with densitometry analysis. MTT measures were normalized to the respective no-hardware control values and revealed >40% reduction in organoid viability with IMT compared to sham (n=5, *p=0.003). Individual values are shown together with the cohort mean (horizontal line)±SD.

FIG. 24. Multi-electrode phase-shift IMT does not produce overt injury in the normal living brain. The multi-electrode devices used in the HGG spheroid and organoid models were implanted bilaterally in the brain of living rats with one hemisphere randomized to 1 week of sham conditions (i.e., hardware but no stimulation) and the other to phase-shift IMT5,9. Representative sections are shown from each brain, numbered 1-3, and stained with thionine. Symmetric defects from the electrode passages were evident bilaterally (arrows) without overt parenchymal injury related to the stimulation.

DESCRIPTION OF THE INVENTION

Definitions

Figure 1:
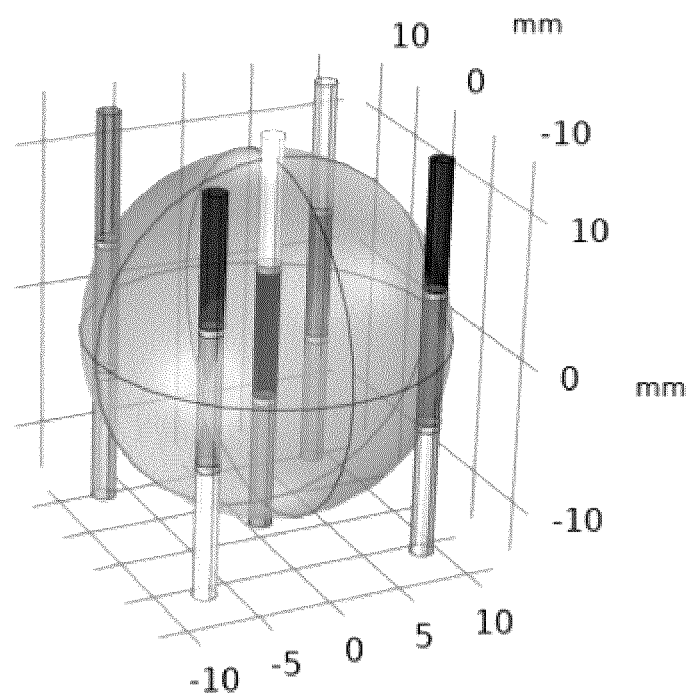
FIG. 1. Geometry of a 5 electrode, 3 contact tumor model (grey) created in COMSOL. Total of 15 contacts, each with separately programmable input waveforms highlighted by different grey scale colours. The tumor is surrounded by normal tissue.

All numerical designations, e.g., volumes, diameters, electrical parameters, are approximations which are varied (+) or (−) by increments of 1.0 or 0.1, as appropriate, or alternatively by a variation of +1-15%, or alternatively 10%, or alternatively 5% or alternatively 2% or alternatively 1%, or alternatively 0.5% and so forth. It is to be understood, although not always explicitly stated, that all numerical designations are preceded by the term "about". It also is to be understood, although not always explicitly stated, that the reagents described herein are merely exemplary and that equivalents of such are known in the art.

As used in the specification and claims, the singular form "a", "an" and "the" include plural references unless the context clearly dictates otherwise.

Throughout this specification and the claims, the terms "comprise," "comprises," and "comprising" are used in a non-exclusive sense, except where the context requires otherwise. Likewise, the terms "include", "has" and their grammatical variants are intended to be non-limiting, such that recitation of items in a list is not to the exclusion of other like items that can be substituted or added to the listed items. "Consisting essentially of" limits the scope of a system, method or non-transitory computer readable storage medium to the specified element, step or instruction and those that do not materially affect the basic and novel characteristics of the system, method or non-transitory computer readable storage medium. "Consisting of" shall mean excluding any element, step, or instruction not specified in the system, method or non-transitory computer readable storage medium. Embodiments defined by each of these transition terms are within the scope of this disclosure. Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

"Tumor" refers to an abnormal mass of tissue that results when cells divide or proliferate more than they should or do not die when they should. Tumors may be benign (not cancer), or malignant (cancer). 'Neoplasm' refers to a tumor mass or diffuse collection of cells divide or proliferate more than they should or do not die when they should. Neoplasms may be benign (not cancer), or malignant (cancer).

"CNS tumor" or "Tumor of the CNS" is meant to include any tumor in the CNS or encroaching on the CNS, including a site beneath the skin, bone or meninges adjacent the CNS. The CNS tumor could be of CNS origin or somatic origin.

"Effective amount" refers to an amount of the composition that is capable of producing a medically desirable result in a treated subject. The methods of the present invention may be performed alone or in combination with other drugs or therapies.

"Dynamically oriented electric field" in the context of this invention refers to an electric field whose orientation can be manipulated to vary over time by applying independent time-varying voltages to each stimulating electrode in an array of such stimulating electrodes. "Dynamically oriented electric field" includes electric fields that are rotatory, migratory, sequential, random, and so forth. Dynamically oriented electric filed may be produced in the context of relative phase shift or relative pulse offset, or multiphase configuration (i.e., applying different frequencies or waveforms to each electrode), amongst other configurations.

In the context of this document, the term "relative pulse offset" includes relative phase shift.

"Electric properties" include but it is not limited to the electrical conductivity, dielectric constants and other parameters of a tissue (tumor or nontumor tissue).

"Subject" refers to a human or non-human mammal having or likely to develop a condition or disease treatable by electrotherapy.

By the term "treating" or "treatment", is meant reversing, minimizing, alleviating, inhibiting the progress of a condition or disease, such as a tumor, or preventing the formation or recurrence of the condition or disease. The term is also meant to include facilitating the delivery or impact of other forms of therapy.

"Prescribed electric field" refers to an electric field, that when averaged over time is at or above a designated threshold throughout a volume of interest.

Overview

As previously stated, a single stimulating electrode with a peripheral ground source used for electric field treatment can only deliver focal therapeutic electric fields that inadequately cover large tissue areas such as tumors. Given the size and invasive nature of many cancers, the potential to treat broader regions of affected tissue is critical. The present disclosure aims to extend the distribution of therapeutic-range electric fields across target tissue volumes, including tumors, using multiple electrodes rather than a single stimulation source. Critical undefined issues to address with this strategy include the maximum target tissue volumes attainable with multi-electrodes, configuration and placement of electrodes and selection of stimulation parameters for maximal safe effect. The present disclosure enables an automatic or simulated process to determine for a particular target tissue site in need of electrotherapy (a) an optimal number of electrodes to be used in the treatment of this particular target tissue site, (b) the optimal placement of each electrode within the particular target tissue site, and (c) the optimal electric parameters to be delivered to the particular target tissue site through the number of electrodes so as to maximize treatable volume of the particular target tissue and provide coverage of the target tissue site's volume with a prescribed electric field, thereby avoiding "cold spots" while minimizing impact on normal tissue, such as non-neoplastic tissues.

The present disclosure may be used in the treatment of a target neoplasm. The target neoplasm may be located anywhere in the body of the subject. Preferably the target neoplasm is a tumor, including a CNS tumor. Examples of CNS tumors include, without limitation, astrocytic tumors, oligondendroglial tumors, oligoastrocytic tumors, ependymal tumor, choroid plexus tumors, other neuroepithelial tumors, neuronal and mixed neuronal-glial tumors, pineal tumors, embryonal tumors, tumors of the cranial and paraspinal nerves, meningeal tumors, and tumors of the sellar region. CNS tumors may also include metastases from primary tumors originating from tissues and organs outside the brain, including but not limited to breast, ovary, prostate, lung, liver, colon, bladder, kidney, and skin. The target neoplasm could be benign or malignant.

The present disclosure provides a new method of treatment planning of a target tissue site using electric fields, which can be delivered, in one embodiment, by intratumoral modulation (IMT). In one embodiment, the method includes: (a) obtaining an image of the target tissue site, (b) determining volume and electric properties of the target tissue site, (c) using the volume and electric properties of the target tissue site to: (i) determine a number of electrodes to treat the target tissue site with electric fields, the number of electrodes being one or more than one electrodes, each electrode having one or more contacts, (ii) determine a placement of the number of electrodes determined in (i) within the target tissue site, and (iii) relative to one of the contacts in one of the number of electrodes at the placement, determine an electric field that results in a prescribed electric field coverage of the target tissue site.

The method of electric field treatment planning of a target tissue site also includes: (a) obtaining an image of the target tissue site, (b) determining volume and one or more electric properties of the target tissue site and surrounding tissue (i.e., tissue that surrounds the target tissue site) based on said image, (c) using the volume and the one or more electric properties of the target tissue site and the surrounding tissue to: (i) determine a number of electrodes to treat the target tissue site with electric fields, the number of electrodes being one or more than one electrodes, each electrode having one or more contacts, (ii) determine a placement of the number of electrodes determined in (i) within the target tissue site, and (iii) relative to one of the contacts in one of the number of electrodes at the placement, determine an electric field that results in a prescribed electric field coverage of the target tissue site while minimizes the volume of surrounding tissue receiving the prescribed electric field. In one aspect, the target tissue site is a tumor and the surrounding tissue is non-pathological or normal tissue.

In one aspect of the method of electric field treatment planning of a target tissue site, the electric fields are electric fields for IMT.

In the context of this disclosure, "a prescribed electric field coverage of the target tissue" means covering an appropriate portion of the prescribed treatment volume of the target tissue that contributes to a desired therapeutic effect. As such the appropriate portion could be between 1% and 100% of the entire volume of the target tissue. The appropriate portion is a specific fraction of the entire volume of the target tissue and is case specific. The appropriate portion may be 50% for one case but may also be 90% or more of the entire volume of the target tissue including 91%, 92%, 93%, 94% 95%, 96%, 97%, 98%, 99% and up to 100% of the volume of the target tissue, and any percentage between 90% and 100%, any range there in between, including decimal points such as 90.1%, 90.2% and so forth.

The present disclosure could also be used to plan electrotherapy of non-neoplastic target sites, including but not limited to skin, muscle, nerves, spinal cord, brain and other organs. It may also be used to target areas of the body that contain infections from parasites, bacteria, viruses, *mycoplasma* and other invasive beings or substances. The disclosure could also be used to sensitize tissues to other therapies or improve the delivery or uptake of therapeutic agents, including but limited to pharmacotherapies, genetic therapies, molecular therapies, radiation or light therapies.

The steps of the method of treatment planning may be determined with the use of at least one data processor.

Figure 4:
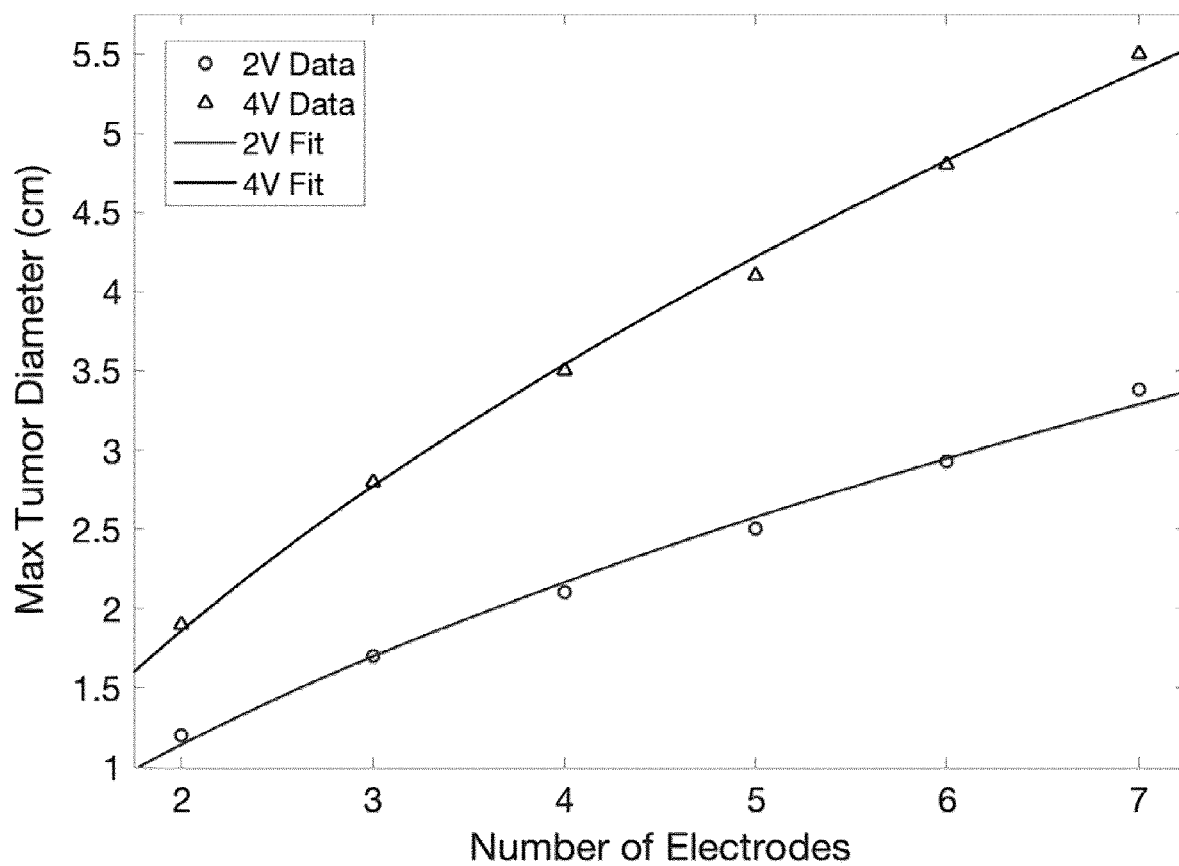
FIG. 4. Maximum treatable tumor diameter (95% coverage of 95% of prescription 1 V/cm) for 2, 3, 4 and 5 single contact electrodes at both 2 V and 4 V input sine wave amplitudes. In one embodiment, with 5 electrodes, at 4 V, with optimal location and dynamic field settings determined as per the present disclosure, tumors of up to 4.14 cm diameter could be treated.

After treatment planning optimization, the maximum target tissue that is covered by the prescribed electric field can be determined for an increasing number of electrodes (see FIG. 4).

Figure 16:
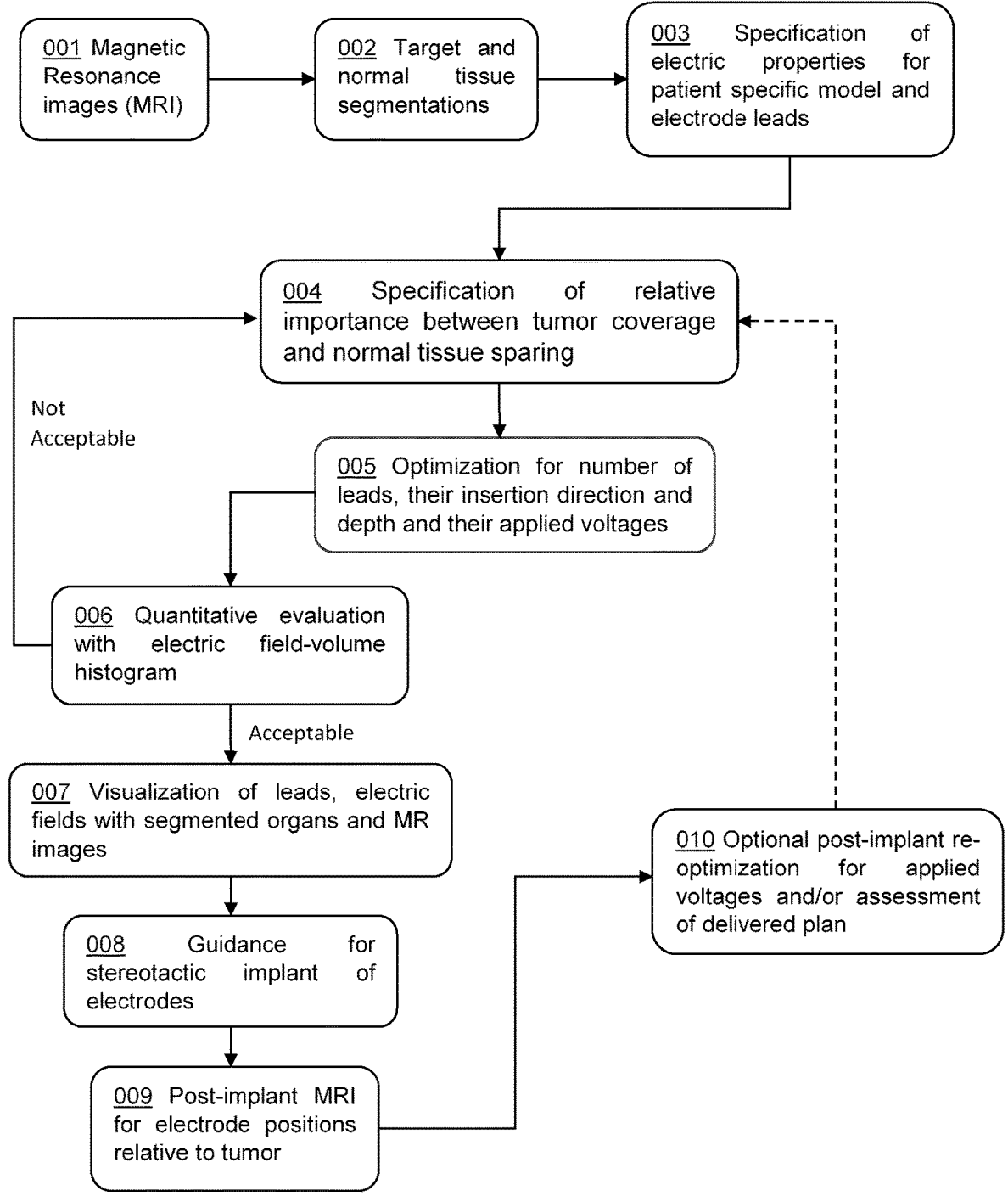
FIG. 16. Flow chart of a method of treatment planning in accordance to one embodiment of the present disclosure. The term "tumor" in the chart of FIG. 16 refers is also meant to include target tissue sites for treatment that are not necessarily tumors.

A method of treatment planning of a target tissue site using electric field stimulation is illustrated in FIG. 16. With reference to FIG. 16, an image, such as a magnetic resonance image (MRI), is taken from a subject to be treated (step 001) and stored in a computer unit. In step 002, the image in the computer unit is segmented to delineate normal tissue (in this case non-cancerous) and tumor tissue (the target tumor). Based on the target tumor and normal tissue segmentations, the electric properties of the segmented tissues are specified in the computer unit (see [4]-[7]) (step 003). In step 004, information on the relative importance of each segment, and what tissue, if any, can be spared of electric treatment is inputted into the computer unit. Using the information from steps 001 to 004, the computer unit determines the optimization for the number of electrodes, the direction of insertion of the leads into the tissue of the subject, the depth of insertion, and the electric field that results in a prescribed electric field coverage of the target tissue site while minimizes the volume of surrounding tissue receiving the prescribed electric field (the applied electric properties) (step 005). Next, a quantitative, cumulative electric field volume histogram (EVH) (6, 9) can be used to summarize the tumor coverage using the optimization parameters determined in step 005. If the coverage of the target is not sufficient or insufficient normal tissue sparing (NO), then the specifications of step 004 can be adjusted and plan re-optimized. If there is good coverage (i.e. 90% or greater of the target volume is covered by the required threshold of 1 V/cm) of the target and sparing of normal tissues (YES), then in step 007 the electric fields is superimposed to the segmented image obtained in step 002 to allow visualization of the leads and the electric fields with segmented tumor and normal tissues (see FIGS. 13B and 13C). The placement of electrodes in images of step 007 are then used as guidance for stereotactic implant of the electrodes (step 008). A second, post-electrode implant, image may be taken to visualize the actual position of the electrodes relative to the target (step 009, see FIGS. 14A and 14B). The second image of 009 can be used for re-optimization of applied electric parameters, such as voltage and electric shift, and/or assessment of delivered plan (step 010).

Identical waveforms with different phase shifts, similar waveforms of different frequencies, or entirely different waveforms can be used for each electrode. The waveforms can be sinusoidal, or non-sinusoidal. Non-sinusoidal waveforms such as, but not including rectangular, triangle, ramp and other pulses can be used. Pulses can be of different pulse width or pulse delays. Other custom waveforms can also be used for each electrode.

The electrodes may be made of any suitable material, such as platinum-iridium, platinum, stainless steel and so forth.

The present disclosure relates also to a system for electrotherapy treatment planning. The system, in one embodiment, includes: a generator for generating electric field parameters, including IMT parameters and at least one data processor unit. The system for electric field treatment of a target tissue can include: a generator for generating electrical field parameters, a plurality of electrodes having one or more contacts, and at least one data processor, wherein the data processor unit includes instructions to: (a) receive data relating to a volume of the target tissue site and one or more electric properties of the target tissue site, (b) use the data relating to the volume of the target tissue site and the one or more electric properties of the target tissue site to: (i) determine a number of electrodes to treat the target tissue site with electrical field, the number of electrodes being one or more than one electrodes, each electrode having one or more contacts, (ii) determine a placement of the number of electrodes determined in (i) within the target tissue site, and (iii) relative to one of the one or more contacts in one of the number of electrodes at the placement, determine an electric field that results in a prescribed electric field coverage of the target tissue site.

In one embodiment, the at least one data processor may further include instructions to (a) receive data relating to a volume and one or more electric properties of tissue surrounding the target tissue site ("surrounding tissue"), (b) use the data of the surrounding tissue obtained in (a) to: (i) determine a number of electrodes to treat the target tissue site with electrical field, the number of electrodes being one or more than one electrodes, each electrode having one or more contacts, (ii) determine a placement of the number of electrodes determined in (i) within the target tissue site, and (iii) relative to one of the one or more contacts in one of the number of electrodes at the placement, determine an electric field that results in a prescribed electric field coverage of the target tissue site while minimizes the volume of surrounding tissue receiving the prescribed electric field.

The present disclosure relates also to a non-transitory computer readable storage medium, wherein code embodied in the computer readable storage medium executed by a processor performs operations, the operations including: (a) receiving, by at least one data processor, data relating to volume of a target tissue site and to one or more electric properties of the target tissue site, (b) using the data relating to the volume and the one or more electric properties of the target tissue site to: (i) determine a number of electrodes to treat the target tissue site with electric fields, the number of electrodes being one or more than one electrodes, each electrode having one or more contacts (ii) determine a placement of the number of electrodes determined in (i) within the target tissue site, and (iii) relative to one of the one or more contacts in one of the number of electrodes at the placement, number of electrodes at the placement within the target tissue site, determine an electric field that results in a prescribed electric field coverage of the target tissue site.

In one embodiment of the non-transitory computer readable storage medium, the code embodied in the computer readable storage medium executed by a processor performs operations, the operations further include (a) receiving data relating to a volume and one or more electric properties of tissue surrounding the target tissue site ("surrounding tissue"), (b) using the data of the surrounding tissue of (a) to: (i) determine a number of electrodes to treat the target tissue site with electrical field, the number of electrodes being one or more than one electrodes, each electrode having one or more contacts, (ii) determine a placement of the number of electrodes of (i) within the target tissue site, and (iii) relative to one of the one or more contacts in one of the number of electrodes at the placement, determine an electric field that results in a prescribed electric field coverage of the target tissue site while minimizes the volume of surrounding tissue receiving the prescribed electric field.

The electric field of the methods, systems and non-transitory computer readable storage medium may be a dynamically oriented electric filed.

Example 1—In Vitro IMT Model

1. Materials and Methods

Electric Field Simulation

The in silico tumor and electrode models were created in COMSOL Multiphysics (v5.4). Material properties were assigned to each geometrical entity in the model, including tumor, electrodes, and surrounding media. The optimization procedure in the present study does not depend on tumor site/location, though the electrical properties of the tumor and surrounding tissue are needed. Since the electrical properties in the brain are most well-known, these simulations were completed using human brain and tumor tissue as an example. The relative dielectric and conductivity values used in this model for human brain and tumor tissue were obtained from the literature for intermediate frequencies between 50 and 100 kHz [4]-[7]. The relative dielectric and conductivity values for the tumor were 2000 and 0.24 S/m respectively, and for the normal surrounding grey matter brain, 3000 and 0.25 S/m [5]-[10]. In line with clinically used electrotherapy implants [11]-[14], the electrode material used was a platinum-iridium biocompatible conductor with a relative permittivity of 1 and conductivity of $5.278 \times 10^6$ S/m. It should be understood that electrodes of other materials may also be used in the methods and systems of the present disclosure, for example, platinum electrodes, stainless steel electrodes or other materials. The electrodes were assigned a 0.8 mm radius with variable contact height, location in polar coordinates (r, θ) and input voltage sinusoidal waveforms ($A\sin(2\pi ft-\phi)$), where A is the amplitude, f is the frequency (200 kHz in this particular case), t is the time, and $\phi$, is the phase shift. Non-ablative input voltage amplitudes of 2 and 4 V were applied in this study. A low input voltage amplitude of 2 V is within the range of clinically used non-ablative electrotherapies and was applied in this study. In the present model of constant voltage stimulation, the impedance Z of the tissue (equation 1) depends on resistance R (~300Ω), frequency f and capacitance C (~$10^{-10}$ F) and is dominated by the resistance (and therefore conductivity) up to frequencies of ~2 MHz.

$$|Z| = \frac{1}{\sqrt{\left(\frac{1}{R}\right)^2 + (2\pi fC)^2}} \quad (1)$$

Impedance is frequency dependent, so changes in the electric field distribution with frequency are mainly due to the change in impedance. In our case, there is less than 1% change in the impedance over the range of 0-350 kHz for the 2-electrode configuration. In order to determine the frequency range that applies to all of our models, the electric field is simulated for the most complex 5 electrode geometry and the relative difference in the temporal average electric field magnitude is calculated ΔE/E. We will consider electric field maps equivalent if the mean relative difference is within 1%, which was found for frequencies up to 500 kHz. The tumor conductivities (E R $\propto 1/\sigma$) and relative dielectric constants (C$\propto\epsilon$) were also analyzed in this manner, and conductivities between 0.2 and 0.3 S/m and dielectrics between 500 and 4000 have equivalent field maps within 1% relative difference.

The tumor volume was given a variable diameter to allow for the computation of maximum tumor size versus number of electrodes. The total electrode contact height used was the tumor diameter+2 mm, to ensure adequate coverage at the poles, and for multiple contact electrodes, the spacing between contacts was 0.5 mm. The height of exposed electrode contact is held constant between single, dual and three contact models. Starting with 2 single contact electrodes, the number of electrodes was increased to 3, 4, 5, 6, 7 and 9 and the number of contacts per electrode was also increased to 2 and 3 to further demonstrate our optimization algorithm in 3 dimensions (FIG. 1).

Using the AC/DC module in COMSOL Multiphysics, each electrode contact was given a separately programmed input voltage waveform terminal boundary, and any spacing between multiple contacts was insulated. Electrical insulation was also assumed on the outer boundary of the surrounding material. A free tetrahedral mesh was created for the model, with varying sizes depending on the volume material. The surrounding brain had a minimum mesh element size of 2.4 mm, the tumor had a mesh with a minimum 1.08 mm element size, and the electrodes had a minimum element size of 0.6 mm. Due to the repetitive nature of the electric field magnitude produced from sinusoidal waveforms, a time-dependent study was used to compute the electric field at 16 time points over half of the period. A finite-element method was used to compute the electric potential distribution on mesh points for our model, and the electric field was directly derived from the electric potential (—∇V).

In the present examples, mostly sinusoidal waveforms were used (i.e., that are pre-set by the waveform generator vendors). Standard waveform generators provide standard sinusoidal, square, triangular waveforms, amongst others. In addition of the standard waveform generator, the present disclosure also contemplates a waveform generator that allows to enter our own waveforms, which can be as flexible as an operator may want (for example, one can have sinusoidal waveforms that are of one frequency (for example 200 kHz), but modulated in amplitude by another waveform of a different frequency (e.g. 1 Hz). As such, the present disclosure contemplates the use of arbitrary user-input waveforms in addition to the standard waveforms. Each electrode can be stimulated by the same waveform with different phase shifts or by a user-defined waveform for each electrode.

Optimization Algorithm

The optimization of the electric field coverage was coded in MATLAB and the COMSOL MATLAB Livelink used to connect our COMSOL model to our MATLAB code. A least squares objective function was chosen (equations 2, 3), which when minimized, optimizes the electric field coverage of the tumor over time. First the average electric field over a half period for a single voxel was computed. Next, covered voxels (with time averaged electric field 1 V/cm) and uncovered voxels (time averaged electric field <1 V/cm) were distinguished through the Heaviside function of the difference between the average and prescription field of 1 V/cm. Covered voxels contribute a value of 0 to the objective. The squared difference of the average and prescribed fields determines how much an uncovered voxel contributes to the objective.

$$\overline{E}_j = \frac{1}{N_t} \sum_{i \in t} E_{i,j} \quad (2)$$

$$f = \frac{1}{N_s} \sum_{j \in s} \Theta(E_{pres} - \overline{E}_j)(\overline{E}_j - E_{pres})^2 \quad (3)$$

The optimization parameters used in this study were the location of each electrode (r, θ), and the phase shift ϕ of each electrode contacts input waveform. The number of variables depends on the number of electrodes, and the number of contacts per electrode. In the present study, we held one electrode angle θ and one contact phase ϕ constant at 0 as the reference. Therefore, if n is the number of electrodes and c is the number of contacts, a full parameter optimization contains 2n +nc −2 variables.

For each iteration of variables in the optimization algorithm, the electric field over time was computed in COMSOL, and the resultant field was interpolated on a 100×100×100 grid of equally spaced points covering the tumor volume. As our first step, we employed only electric field values within the tumor volume in the evaluation of the objective function.

It can be shown that this optimization problem is non-convex when we optimize for both location and offset. Furthermore, the computation of the gradient of our objective, which must be estimated by finite differences, is unreliable due to the mesh grid discretization of the electric field.

Due to the non-convexity of our problem and the unreliability of the gradient, we chose the pattern search method, a gradient free, direct search optimization strategy for this study [15]. This approach allows for a broader search of the parameter space, to help avoid falling into a local minimum. Each time the algorithm finds a better solution, the parameter step size is increased. Conversely, if no better point is found, the step size is decreased. The pattern search method was implemented using a custom MATLAB function that minimized our objective within certain bounds with a given starting point. The algorithm was customized to make use of superposition to increase the speed of objective function evaluation. To avoid bias and improve convergence rate, the objective function was evaluated for 2n samples of parameter space to determine the starting point.

Robustness of the Pattern Search Algorithm

The robustness of our pattern search algorithm was evaluated for the 5 electrode, 3 contact full offset optimization (14 variables relative to the top contact of electrode 1). Each of the 14 electrode contacts was assigned a random relative phase shift starting point for the optimization. The pattern search optimization was repeated for 50 more random starting points to evaluate the convergence of the pattern search algorithm to the optimal solution. The starting parameters, optimal parameters, starting objective value, optimal objective value and number of iterations were all considered for each run of the algorithm.

Spherical Tumor Optimal Configurations, Phase Shift and Maximum Treatable Tumor Size The maximum treatable tumor size for each number of electrodes was determined by using the optimal geometric and phase shift configurations found by our algorithm. Since the optimal location within each configuration is dependent on the tumor size, the specific electrode locations were optimized for a range of tumor sizes. The electric field distributions for these optimal locations were then evaluated for the percentage of tumor volume covered by 95% of the prescription field (1 V/cm). The maximum treatable tumor size is that which results in at least 95% of the volume covered by a 95% time average field "dose", adopted from radiotherapy treatment planning [16]. We begin by optimizing the location and phase shifts of up to 9 electrode systems with single contact electrodes. Once we understood this, we optimized the configuration for electrodes with 2 and then 3 contacts.

Results

Sensitivity Analysis

A sensitivity analysis was performed to investigate frequency, conductivity and dielectric constant effects on the electric field. There was <1% change in impedance over the range of 0-350 kHz relative to the 200 kHz impedance value. The relative difference in temporal average electric field maps was found to be <1% for frequencies ranging from 0 to 500 kHz relative to the 200 kHz reference field map. The relative difference in electric field maps was found to be <1% for conductivities ranging from 0.2 to 0.3 S/m relative to the 0.24 S/m reference field map, and dielectric constants between 500 and 4000 had equivalent field maps within 1% difference relative to the 2000 dielectric reference field map.

Robustness of the Pattern Search Algorithm

Figure 2:
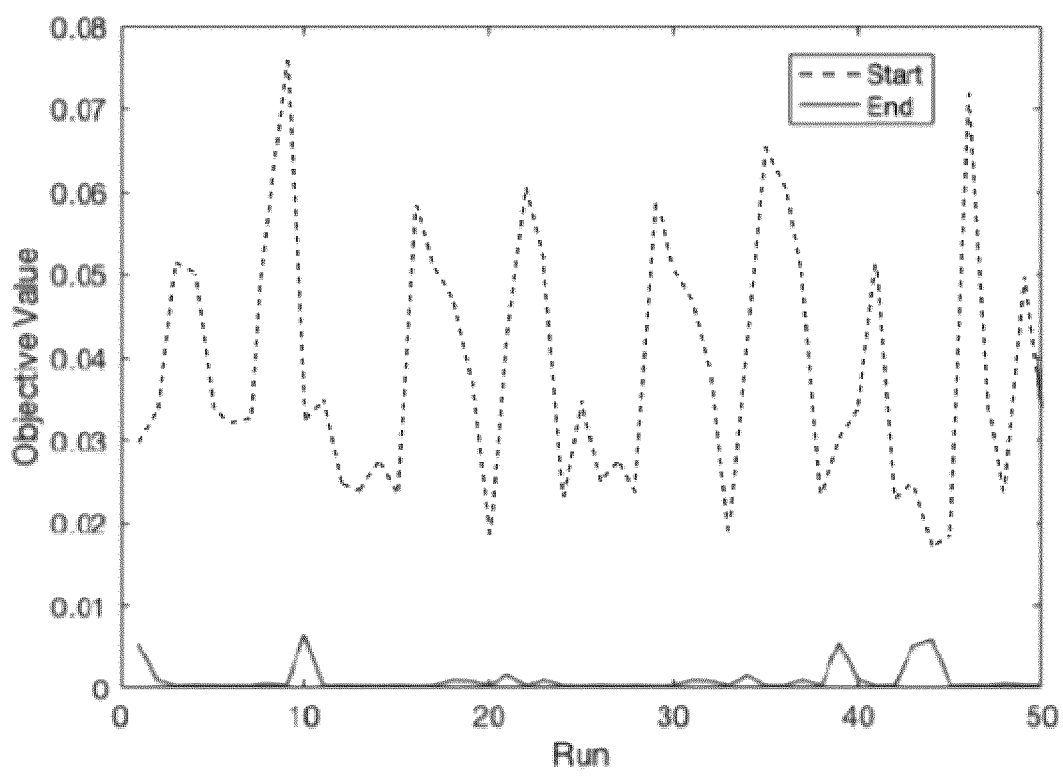
FIG. 2. Objective function value for starting random parameters and final minimized objective value for 50 runs with different random starting parameters.

Our custom pattern search algorithm was robust in finding the global minimum of our optimization problem for the most complex case of full 14 variable phase optimization for the 5 electrode 3 contact model. For the 50 random starting parameter points, the optimization converged to the global optimum 45 times. The start and end objective values for all 50 runs are plotted in FIG. 2.

Figure 3A:
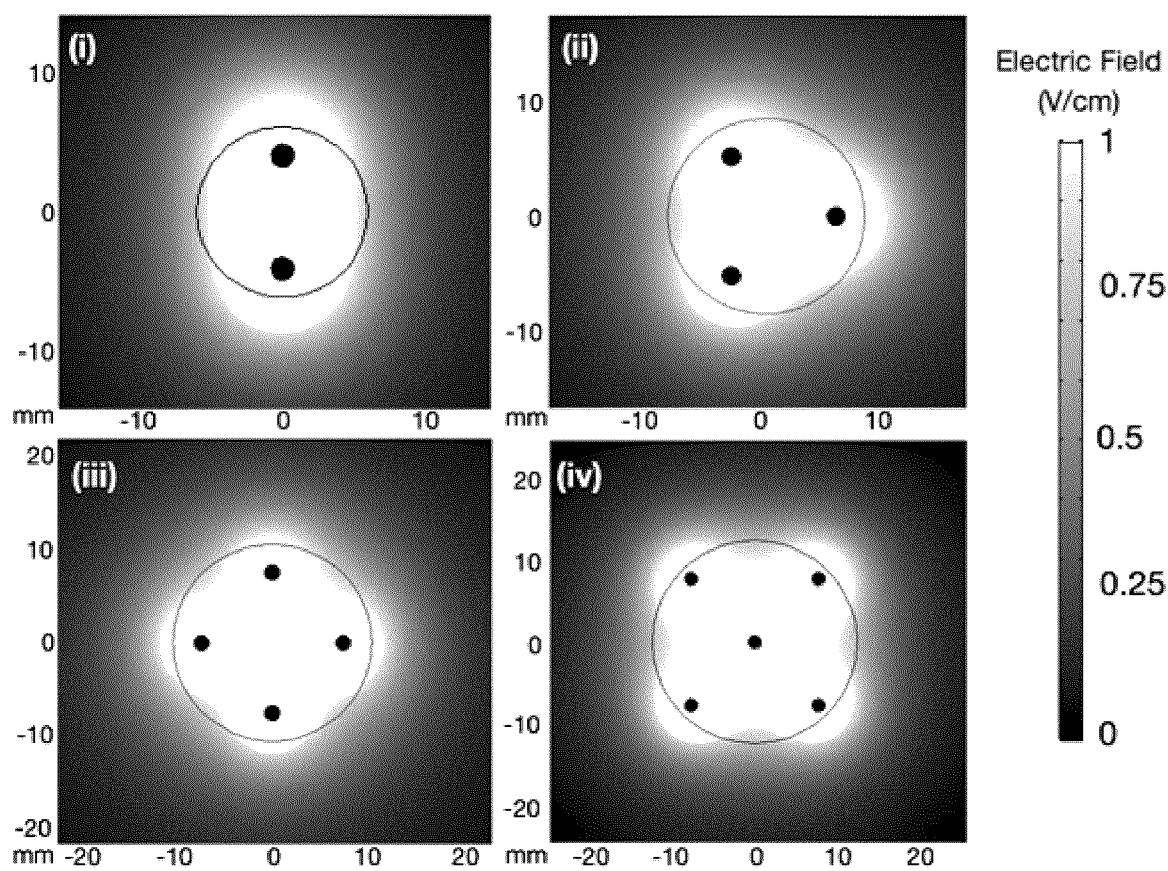
FIG. 3. 3A: Average temporal electric field maps and corresponding animations of field coverage over time for 2 (FIG. 3A(i)), 3 (FIG. 3A(ii)), 4 (FIGS. 3A(iii)), and 5 (FIG. 3A(iv)) optimally placed electrodes in cross sections of corresponding maximum tumor volumes (black circle). 3B: 5 electrode configuration without dynamic field orientation (centre, upper left, bottom right: 2 V amplitude stimulating electrodes, upper right and bottom left: 0 V ground electrodes). 3C: Electric field volume histogram of the tumor volume (cc) receiving at least a certain temporal average electric field value (V/cm) for both optimized dynamic and non-dynamic cases.

Spherical Tumor Optimal Configurations, Relative Phase Shift and Maximum Treatable Tumor Size Single Contact Electrodes:

Beginning with single contact electrodes and a spherical tumor model, we were able use our optimization algorithm to find the configurations and relative phase shifts that resulted in the largest and most uniform electric field coverage over time. We then compared these optimal results to the field coverage when stimulating 2 V amplitude waveforms or ground electrodes were used, with no phase shift. With 2 electrodes, we can intuitively determine the optimal solution for relative phase shift. Since the magnitude of the electric field is proportional to the change in electric potential between electrodes, it would be assumed that maximally separating the input sine waves would lead to the optimal temporal field coverage. The optimization of the 2-electrode model was completed in terms of the separation, and relative phase shift. The result was as expected, with maximally separated waveforms, with electrode 2 phase shifted radians from electrode 1. We found that for the 2-electrode system, the maximum tumor diameter it can cover is 1.2 cm. For this maximum tumor diameter of 1.2 cm, the optimal location was each electrode placed at r=4 mm from the centre of the spherical tumor. The temporal average electric field map of the optimal configuration is found in FIG. 3, as well as the corresponding field animation over time.

We can use the symmetry of our model to hypothesize the optimal 3-electrode solution and compare this to our algorithm results. Again, since we are dealing with a spherically symmetric model, we would hypothesize that electrodes spaced equidistant from each other, and the centre of the sphere, would be optimal. In addition, to create the most homogeneous electric field over time, maximally separated input sine waves would lead to a symmetrically rotating electric field. We found that for a 3-electrode system, the maximum tumor diameter it can treat is 1.7 cm. Using maximum tumor size of 1.7 cm diameter, the optimal configuration found from our optimization was equally spaced input waveforms with phase shifts of $2\pi/3$ and $4\pi/3$ radians relative to electrode 1. The optimal geometrical configuration was with electrodes placed equidistant from the centre, and each other. For this 1.7 cm diameter tumor volume, the optimal distance from the centre was 6 mm. In an animation corresponding to FIG. 3A(ii), it can be seen that these parameters lead to an electric field that rotates over time, encompassing the whole tumor volume, with no stagnant 'cold spots'. For the 4-electrode model, the optimal configuration was all four electrodes placed equidistant from each other, with maximally separated input waveforms (phase shifts of 0.5 $\pi$, $\pi$, 1.5 $\pi$ relative to electrode 1) to create a symmetrically rotating electric field (see FIG. 3A(iii). We found that for a 4-electrode system, the maximum tumor diameter that can be treated is 2.1 cm, for which the optimal distance from the centre for each electrode was 7.5 mm.

Figure 3B:
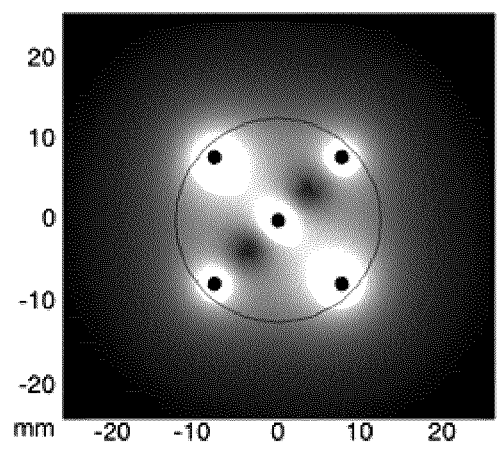
Figure 3C:
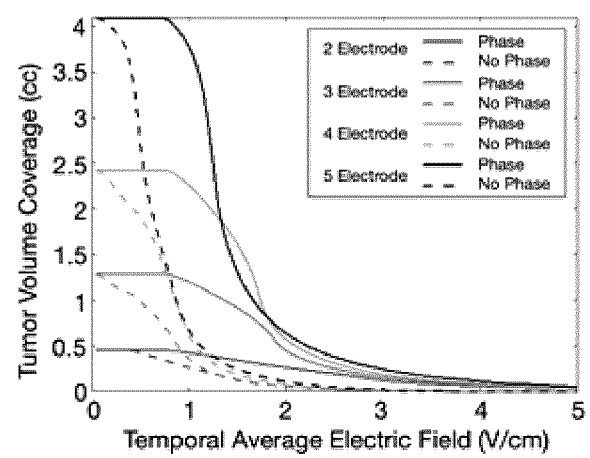

Using a 5-electrode system, the maximum tumor diameter that can be treated is 2.5 cm with 2 V input waveforms. The optimal solution for this case was an electrode placed in the centre, with 4 equally spaced surrounding electrodes (see FIG. 3A(iv). The phase shift relative to the centre electrode were 0.5 $\pi$, 1.5 $\pi$, 0.5 $\pi$, 1.5$\pi$ respectively. For a 2.5 cm diameter tumor, the optimal distance from the centre was 11 mm. Field maps and animations of optimal solutions for both 4 and 5 electrode models can be found in FIG. 3A(iii) and FIG. 3A(iv). For the 5-electrode model, we compared the optimal results to the non-optimized configuration with no use of phase shifting according to this disclosure (FIG. 3B). Since the electric field varied within the tumor volume, a cumulative electric field volume histogram (EVH) [6,9] was used to summarize the tumor coverage. We plotted the absolute tumor volume versus electric field strength in the EVH, indicating the minimum electric field strength that covers a certain volume of the tumor (FIG. 3C). For the 5-electrode configuration when no phase shifting is used, less than 20% of a 2.5 cm diameter tumor volume is covered by 1 V/cm, but for the optimized phase shifting case, 95% of the tumor volume is covered. This large tumor coverage increase can be observed when introducing phase shift to models with any number of electrodes.

Figure 19A:
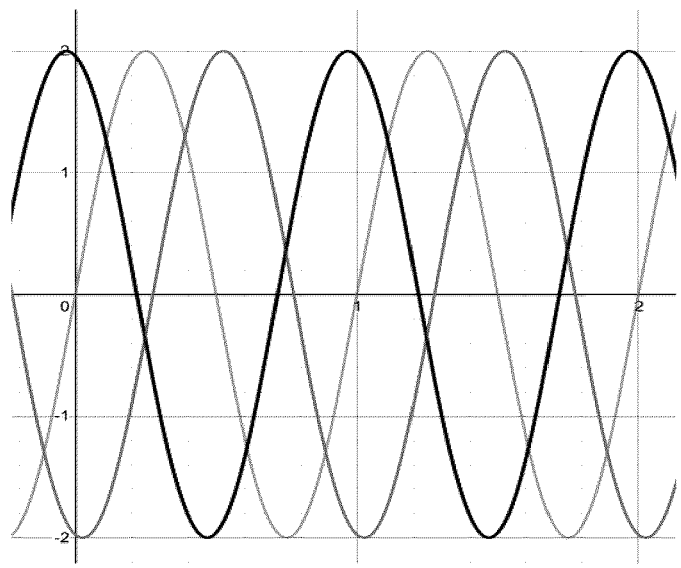
FIG. 19. 19A: Input voltage sine waves of optimal dynamic configurations for 7 electrodes, single contact. 19B: electrode configuration. 19C: Average temporal electric field map of field averages over time for 7 optimally placed electrodes with single contacts.
Figure 19B:
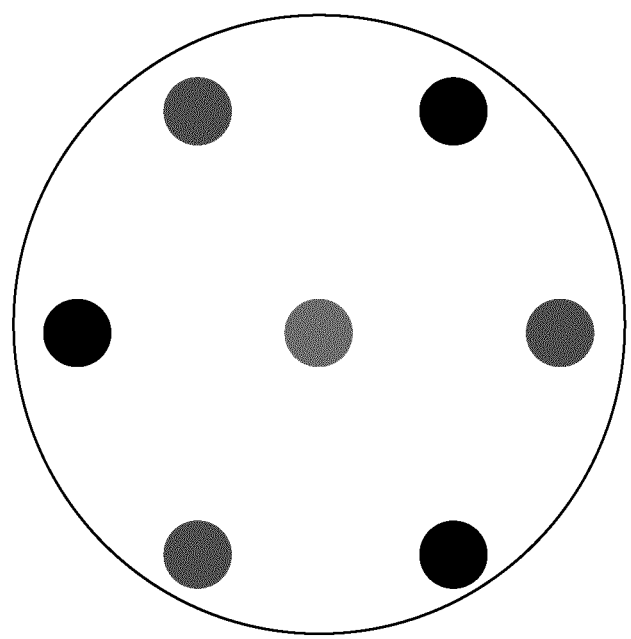
Figure 19C:
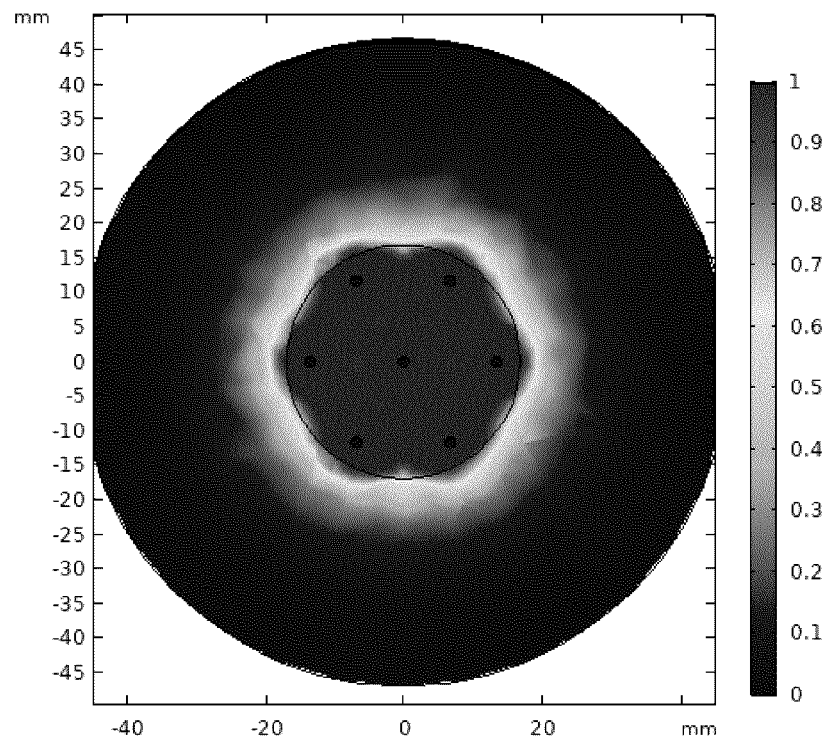

Our methods were extended to investigate the optimal configurations and phase settings for 6 and 7 electrode models. For 6 electrodes, up to 2.94 cm diameter tumors can be covered using 2 V input waveforms with the optimal location of each electrode (r,θ) in mm and radians of (0,0), (13.75, 0), (13, 0.413 $\pi$), (11.5, 0.850 $\pi$), (14.75, 1.2 $\pi$), (11.5, 1.588 $\pi$). The corresponding optimal phase shifts were 0, 0.618 $\pi$, 1.460 $\pi$, 0.372 $\pi$, 0.938 $\pi$, and 1.603 $\pi$ radians. Next for 7 electrodes, up to 3.34 cm diameter tumors can be covered with a configuration of one central electrode, with 6 equally spaced surrounding electrodes at 13.2 mm from the centre. The optimal phase shifts of the surrounding electrodes alternate between 0.550 $\pi$ and 1.436 $\pi$, similar to the 5-electrode configuration. FIGS. 19A-C illustrate optimal relative phase shift (FIG. 19A), electrode configuration (FIG. 19B) and time average field maps (FIG. 19C) of optimal solutions for 7 electrodes.

Figure 20A:
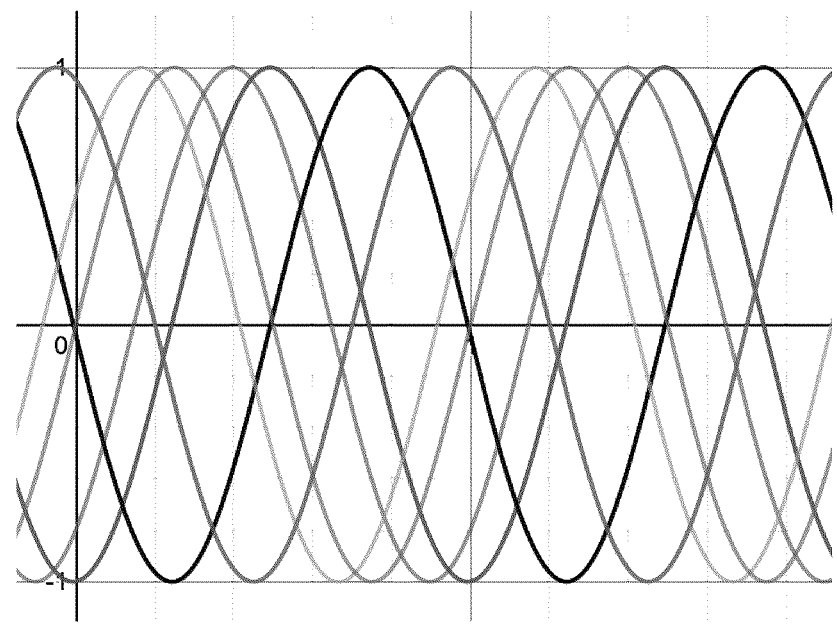
FIG. 20. 20A: Input voltage sine waves of optimal dynamic configurations for 9 electrodes, single contact. 20B: electrode configuration. 20C: Average temporal electric field map of field averages over time for 9 optimally placed electrodes with single contacts.
Figure 20B:
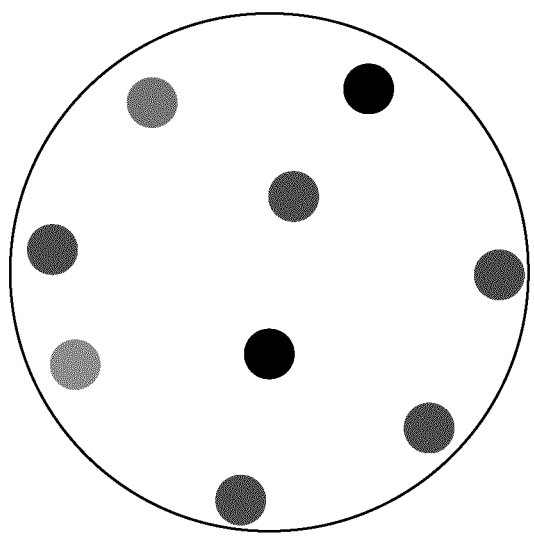
Figure 20C:
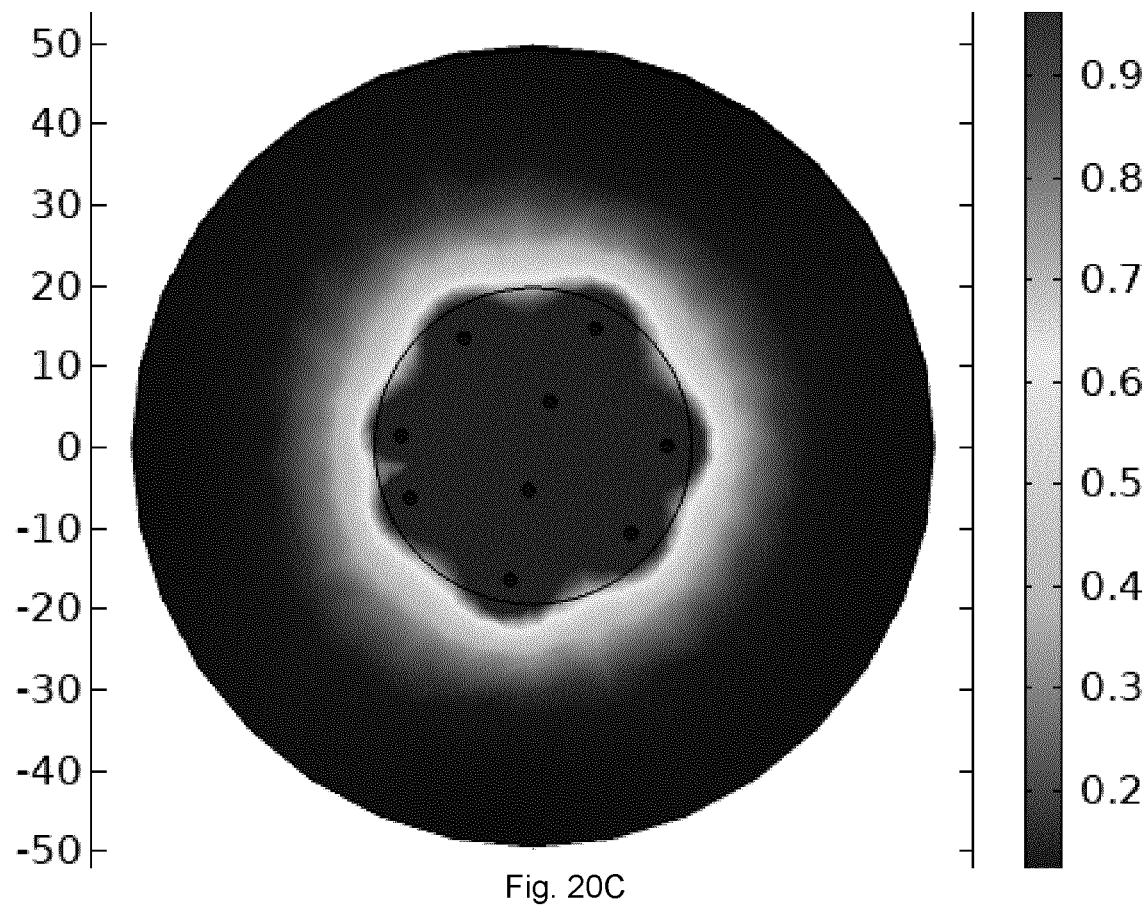

FIGS. 20A-C illustrate optimal relative phase shift (FIG. 20A), electrode configuration (FIG. 20B) and time average field maps (FIG. 20C) of optimal solutions for 9 electrodes. A random location and phase shift of each electrode was used as the starting point for the optimization. The pattern search algorithm ran until an optimal configuration and phase shift were found. This optimal configuration and relative phase shift create a field that moves over time to cover the entire tumour volume with a time-averaged field strength of 1 V/cm. Nine electrodes were able to cover up to 4 cm diameter tumours.

By using the optimal configurations found above, the maximum treatable tumor size (i.e., that with 95% coverage at 95% of the 1 V/cm prescription field) can be determined for each number of electrodes with 2 V and 4 V input waveforms (FIG. 4).

Figure 5A:
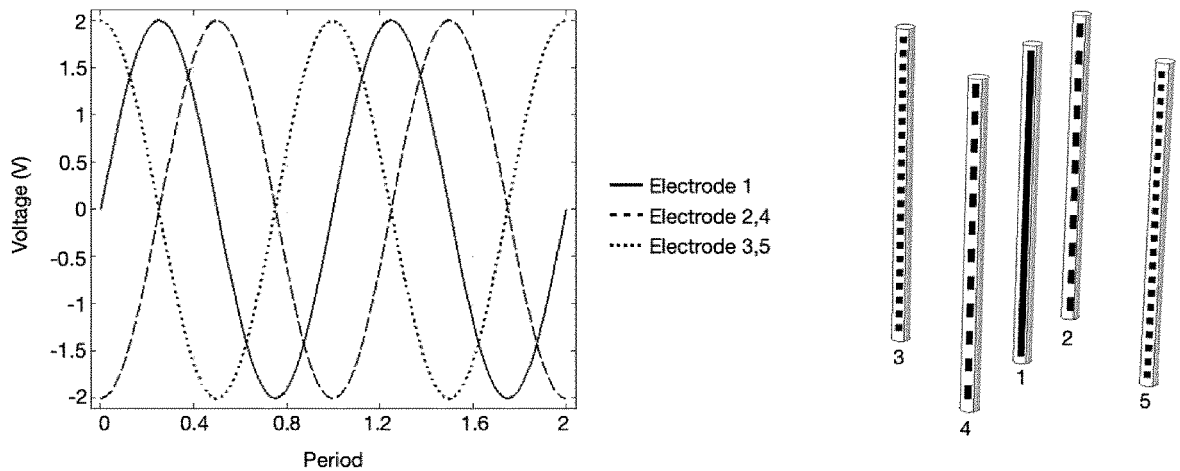
FIG. 5. Input voltage sine waves of optimal dynamic configurations with corresponding contact geometries for (5A) single contact, (5B) 2 contacts, and (5C) 3 contacts. Two periods of the waveforms are shown. Contacts of the same colour have the same dynamic settings, contacts of different hue of the same colour differ slightly in dynamic offset and different colours differ maximally in dynamic offset.
Figure 5B:
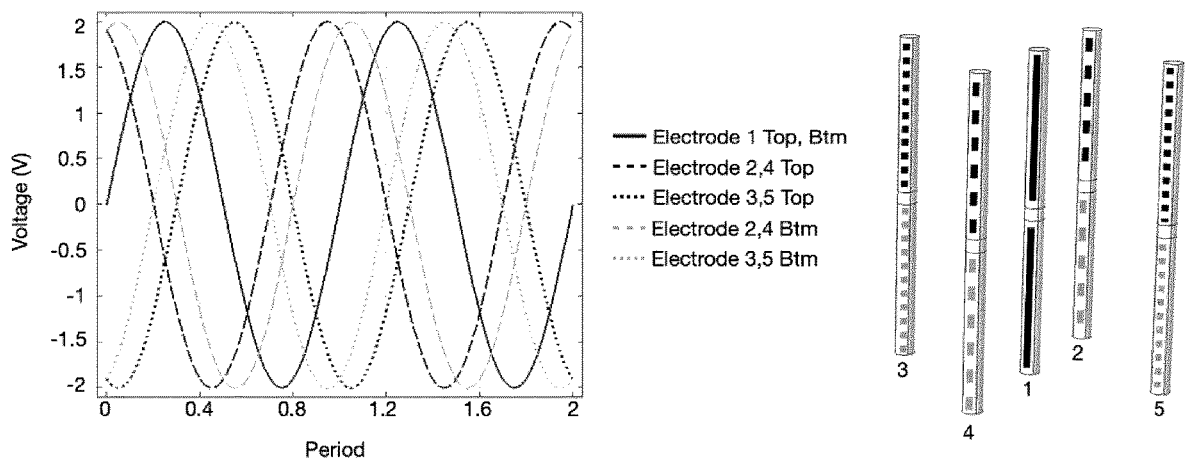
Figure 5C:
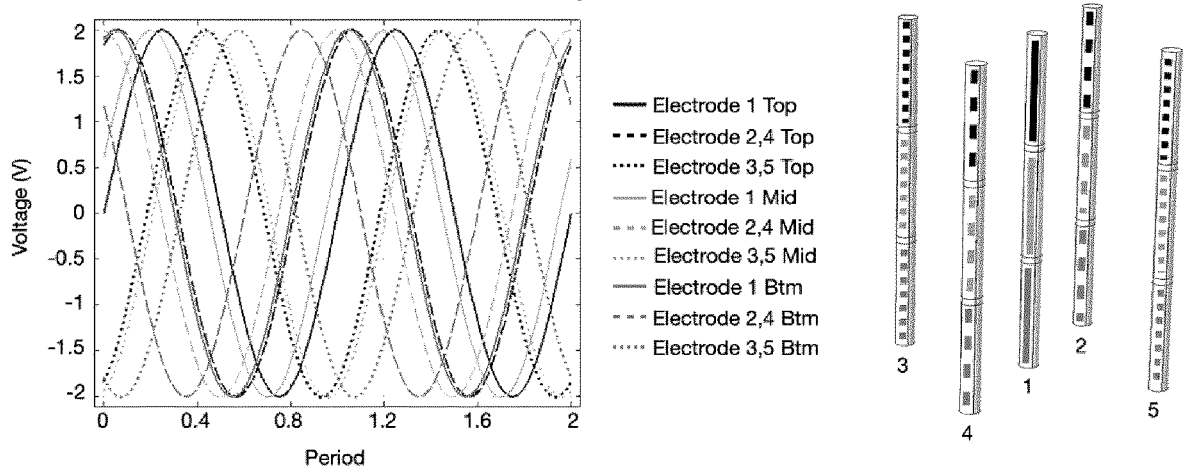

Multi-Contact Electrodes:

We further applied our optimization methods to multi-contact electrode models, with 2 or 3 contacts per electrode. The phase shift parameters of each additional contact were added to the optimization. Starting with a dual contact, 5 electrode model, the optimal configuration is equally spaced electrodes around a central electrode with phase shifts of the top contacts of 0.6 $\pi$, 1.4 $\pi$, 0.6 $\pi$, 1.4 $\pi$, and the bottom contacts 0, 0.4 $\pi$, 1.6 $\pi$, 0.4 $\pi$, 1.6 $\pi$ relative to the top centre electrode. When increasing the number of contacts to 2, our algorithm found an improvement in the objective function value when separating the phase of the top and bottom contact on an electrode. Compared to the optimal single contact configuration (0.5 $\pi$, 1.5 $\pi$, 0.5 $\pi$, 1.5 $\pi$), the top contacts were shifted by +0.1 $\pi$, −0.1 $\pi$+0.1 $\pi$, −0.1 $\pi$, and the bottom contacts were shifted by −0.1 $\pi$, +0.1 $\pi$, −0.1$\pi$, +0.1 $\pi$ (FIG. 5).

Figures 6A, 6B:
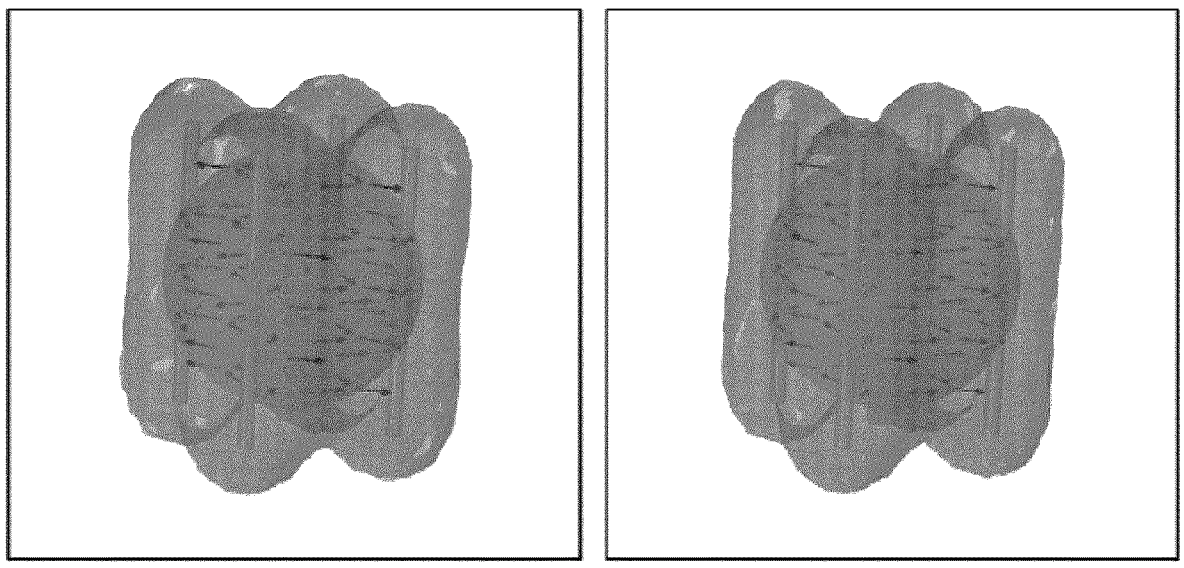
FIG. 6. Animations of 1 V/cm isosurface coverage (outside) of tumor volume (center sphere) over time. Normalized electric field vectors show the field direction over time for both single contact, 5 electrode (6A) and 3-contact, 5 electrode models (6B).

The algorithm of the present disclosure was further applied to the 5 electrode, 3 contact model, where optimal relative phase shifts of contacts were 0.37 $\pi$, 1.63 $\pi$, 0.37 $\pi$, 1.63, for top contacts, 0.10 $\pi$, 0.51 $\pi$, 1.58 $\pi$, 0.51 $\pi$, 1.58 $\pi$ for middle contacts and 0.40 $\pi$, 0.80 $\pi$, 1.35 $\pi$, 0.80 $\pi$, 1.35 $\pi$ for bottom contacts, relative to the top centre contact. By adding a third contact to each electrode the objective was further improved, and each contact on an electrode had separated phase shifts (FIG. 5). For single contact electrodes the electric field vectors rotate in cross sectional planes perpendicular to the electrode length. The addition of multiple contacts per electrode results in electric fields that vary in all three dimensions over time (FIG. 6). These additional contact phase parameters increase the flexibility of field shaping to cover any tumor shape, and result in electric field vector rotation in three dimensions.

The relative phase shift approach of the present disclosure to temporal electric field delivery maximizes the size of tumors that are possible to treat, while minimizing the number of electrodes. In addition, by incorporating multiple individually programmable contacts on each electrode, the present disclosure further improves the field coverage, and field shaping. Being able to control and optimize the distribution of the electric field produced, these methods can be further applied to irregularly shaped patient specific tumor contours. Multiple contacts on each electrode increase the flexibility of our model, to adapt the electric fields to any tumor shape.

The objective function of the present disclosure can also be updated to incorporate other stipulations into the optimization, such as adding a penalty term that would minimize the amount of power a configuration would require. In addition to increasing the magnitude of the temporal field coverage, incorporating relative phase shift results in the electric field vector continuously changing direction.

Though the baseline optimizations presented above were performed on spherical tumor models, the present disclosure has been designed to be used for tumor volumes of any shape, size and tissue properties. The incorporation of multiple separately programmable contacts on each electrode allows for the optimization of irregularly shaped tumors to produce unique field coverage patterns. Non-parallel implanted electrodes can be compensated by varying the input voltage amplitudes along the contacts of each electrode. In addition the algorithm of the present disclosure can incorporate tissue sparing and organs at risk to minimize field exposure outside of the tumor. Overall, the present optimization algorithm can be applied to any patient specific tumor model, for different electrode designs and optimization parameters.

Conclusions

The present methods for temporally optimizing the electric field coverage with respect to relative phase shift programming, geometrical configurations, electrode and contact numbers for IMT are the first of their kind, and have the adaptability to be able to incorporate a wide range of optimization parameters and tumor types. With these methods we have the capability to optimize planned implant location and settings as well as phase shift and voltage programming post-implantation. These baseline tumor electrode configurations and phase shift settings are a critical step in developing a patient specific treatment planning system for IMT.

The above disclosure generally describes the present disclosure. Changes in form and substitution of equivalents are contemplated as circumstances may suggest or render expedient. Although specific terms have been employed herein, such terms are intended in a descriptive sense and not for purposes of limitation. Other variations and modifications of the disclosure are possible. As such modifications or variations are believed to be within the sphere and scope of the disclosure as defined by the claims appended hereto.

Example 2

Materials and Methods

Glioma spheroid and organoid preparations. This study was approved by the Human Research Ethics Board at Western University and carried out in accordance with the Tri-Council Policy for research involving human subjects. Informed consent for tumor tissue was obtained from all patients or their legal guardians and tumor diagnosis was confirmed by a neuropathologist. Clinically relevant genetic profiling was performed at the neuropathologist's discretion but not used as study inclusion/exclusion criteria. Tumor specimens were initially collected into DMEM in the operating room and transferred promptly to the lab for cell culture or organoid preparation.[1,2] Glioma cells from 5 patient tumors were transduced with a lentiviral vector encoding firefly luciferase (FLuc) driven by the constituitive elongation factor 1 alpha promoter to create primary 3D spheroids amenable to real time monitoring with bioluminescence imaging (BLI).[5,6] HGG spheroids were created in 7 mm diameter culture wells by implanting tumor cells ($4 \times 10^4$ cells in 2 µL phosphate-buffered saline (PBS)) into 200 µL Matrigel matrix (Corning) over a 2-minute period. The matrix with embedded tumor cells was allowed to polymerize at 37° C. with 5% $CO_2$ for 20 minutes before the addition of 100 µL of complete Dulbecco's modified Eagle's medium (DMEM; Wisent Bioproducts) containing 10% fetal bovine serum (FBS; Life Technologies), 1% non-essential amino acids and 1% penicillin/streptomycin (Life Technologies).

Solid glioma organoids were prepared from an additional 5 patient tumors. Tumor tissue was washed with PBS and 5 mm punch samples (Integra Milex) suspended in a 7 mm diameter culture well containing 100 µL Matrigel (Corning). The matrix with embedded tumor fragment was allowed to polymerize at 37° C. with 5% $CO_2$ for 20 minutes before the addition of 100 µL of NeuroCult™ NS-A medium supplemented with 10% proliferation supplement, bFGF (10 ng/mL), EGF (20 ng/mL), heparin sulfate (2 µg/ml) and 1% penicillin/streptomycin (Stemcell Technologies).

Multi-electrode IMT model. A 3-electrode device was custom designed and fabricated for preclinical evaluation of expanded IMT parameters, including phase-shifted waveforms, in 3D glioma models. The hardware was adapted for 7 mm culture wells with embedded tumor spheroids and organoids, as described above, and consisted of three biocompatible, uninsulated, platinum electrodes (6 mm length, 0.25 mm diameter, 2 mm inter-electrode distance) mounted to a common pedestal made of polyether ether ketone. A thread and groove system on the pedestal allowed fixation to a modified culture lid and secure cable connection to the waveform generator (Rigol DG1022; Electro-Meters Ltd). The device was positioned within the Matrigel 24 hours following spheroid or organoid implantation to create sham control (i.e., implanted hardware but no stimulation) or IMT conditions for a 72-hour period using electrode configurations guided by the simulation analysis. A third tumor specimen provided a no-hardware control scenario for each run.

Computer simulation of IMT electric fields. The computer simulations used physical geometries of the culture models so that in silico treatment parameters could be subsequently evaluated in HGG spheroids and organoids. Simulated electric field maps generated using the following electrode configurations were evaluated: 1) a single stimulating electrode with a paired ground electrode, 2) 2 stimulating electrodes using in-phase waveforms with 1 ground electrode and 3) 3 electrodes each with an equal 120 degree phase-shift between output waveforms.11 The electrical output of all configurations included a sinusoidal waveform of 4V peak-to-peak amplitude (+/−2V, max/min) and 200 kHz frequency which have previously been effective in HGG cell culture and in vivo models.[2,3] IMT models were constructed using the AC/DC module, electric currents user interface in COMSOL Multiphysics (v 5.4) with biocompatible, platinum stimulating and ground electrodes. The 3-electrode model permitted a choice of waveform for each electrode, including selection of relative phase-shifts. Material electrical properties of conductivity and relative permittivity were assigned to the components of the treatment models, with respective values of 1.5 S/m and 81 for Matrigel and $9.43 \times 10^6$ S/m and 1 for the platiumn electrodes.[7-9] Terminal boundary conditions were applied to each electrode and electrical insulation was assumed on all outer boundaries of the model.[4] A tetrahedral mesh was used and the electric field computed over a waveform period for each scenario. The average electric field delivered to each voxel over time was analyzed in MATLAB R2020b using the COMSOL MATLAB Livelink to generate average electric field maps and electric field volume histograms (EVH) outlining the percentage of Matrigel tumor bed volume covered by the corresponding time average electric field.

Tumor viability assays. Spheroid viability was measured using BLI emission intensity captured with a cooled CCD camera mounted in a light-tight specimen box (IVIS hybrid optical/Xray scanner, IVIS Lumina XRMS, PerkinElmer).[6] The luciferase substrate, D-luciferin (300 µg/mL), was added to the culture media following the treatment period and imaging performed at 60 second intervals until peak signal was obtained and the mean photon flux (photons/second/mm$^2$) measured (Living Image, Xenogen). A second measure of spheroid viability was obtained using the 3-(4, 5-dimethylthiazol-2-yl)-2,5-diphenyltetrazolium (MTT) assay (Sigma Aldrich). This spectrophotometric test measures the reduction of yellow MTT by mitochondrial succinate dehydrogenase to an insoluble, dark purple Formosan product. Following treatment, MTT (20 µl at 5 mg/ml) was added to the culture media and spheroids incubated for 3 hours at 37° C. in a humidified 5% $CO_2$ atmosphere. Spheroids were then lysed to release the purple Formosan product by the addition of 80 µl dimethyl sulfoxide (DMSO) for 15 minutes at room temperature. Absorbance was measured using a microplate spectrophotometer (Epoch) and viability estimated using optical density values at 570 nm with references at 655 nm.[7]

Glioma organoids were similarly assessed using the MTT assay. However, these solid tumor specimens did not readily lyse with DMSO for measuring absorbance so viability was quantified using densitometry analysis (ImageJ, version: 2.0.0-rc-69/1.52p). Tissue density readings were obtained by isolating the organoid image using the automated thresholding tool. The optical density was then measured using the analysis tool to produce a densitometry plot. The area under the plot was quantified and normalized to the cross-sectional area of the corresponding organoid to account for variations in organoid size. All BLI, MTT and densitometry values obtained following sham or IMT conditions in spheroid and organoid models were normalized to the respective no hardware control measures.

In vivo IMT control studies. The same 3-electrode device and phase-shift IMT parameters described above were evaluated in normal rodent brain to assess for neurological and lesional adverse effects. IMT devices were stereotactically implanted under isoflurane anesthesia bilaterally into the striatum in 3 male Fischer rats (coordinates from bregma: anteroposterior 1 mm, lateral+/−3 mm, dorsoventral −6 mm). On postoperative day 4, IMT was randomized to the right or left side and the respective device connected to a waveform generator (Rigol DG1022; Electro-Meters Ltd) via an extension cable and a commutator that permitted the animal to move freely throughout the home cage[2]. The contralateral hemisphere served as an internal sham control (i.e., identical hardware implants but without stimulation). Continuous multi-electrode, phase-shift IMT was delivered between postoperative days 4-11 with the same parameters used to treat the HGG spheroids and organoids. All animals were given free access to food and water, perioperative antibiotics and analgesics, and monitored daily for medical or neurological complications. On postoperative day 11, animals were deeply anesthetized with sodium pentobarbital and transcardially perfused with 4% paraformaldehyde. Brains were cut on a cryotome into 25 µm thick sections through electrode implantation sites, mounted onto microscope slides and stained with thionine. Processed sections were digitally imaged with a Nikon Eclipse Ni-E microscope.

Statistical Analysis Datasets were compared using a Student's t-test with significance considered at p-values <0.05 (Graphpad Prism8, CA, USA). Values are presented as mean±standard deviation (SD).

Results

Figure 7:
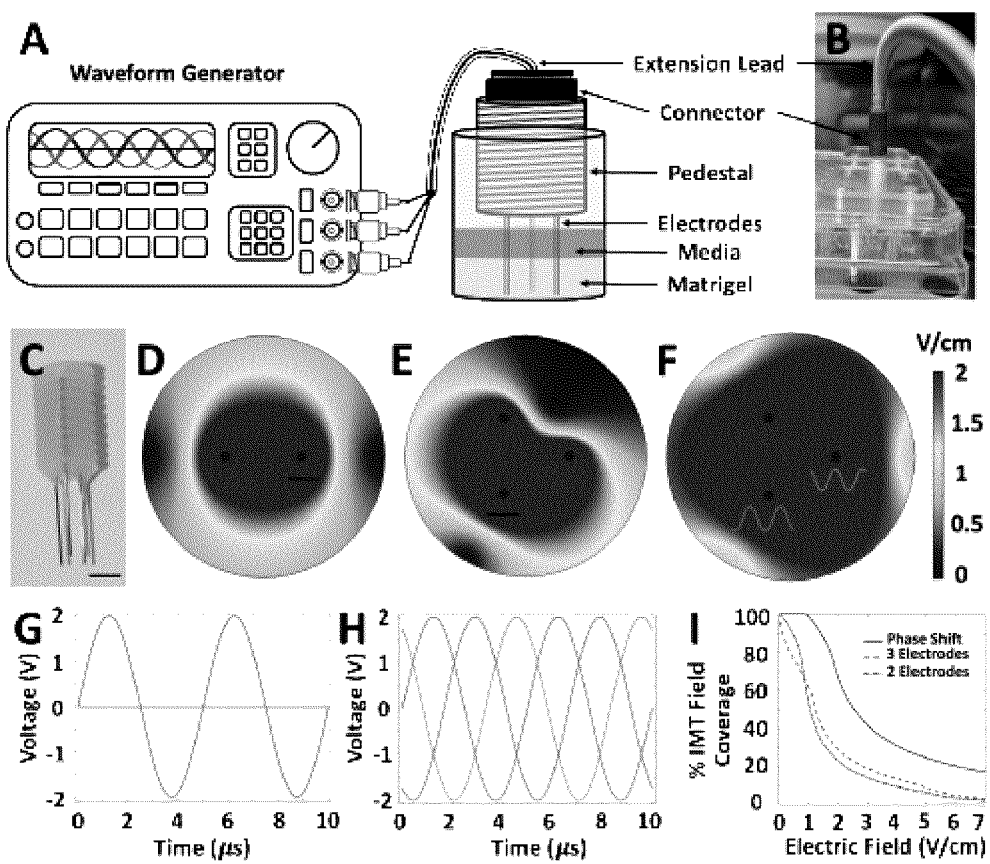
FIG. 7. Transition from single to multiple stimulating electrodes with phase-shift output enhances electric field coverage. 7A: A 3D IMT model was created in which broad variations in stimulation parameters could be evaluated in patient-derived HGG spheroids and GBM organoids. 7B: Photo showing the modified culture plate that accommodates fixed implantation of the IMT electrode device into the tumor bed and connection of the device to a waveform generator. 7C: Custom fabricated preclinical IMT multi-electrode device used both in the 3D HGG models and in vivo control rat brains5. 7D-7F: Cross sectional area of the 3D culture well is shown with computer simulation of the IMT model using COMSOL geometry to produce time average electric field maps for 7D: 2 electrodes (1 stimulating+1 ground), 7E: 3 electrodes (2 in-phase stimulating+1 ground), and 7F: 3 stimulating electrodes equally phase-shifted. The transition to a multi-electrode, phase-shifted output created marked improvement in field distribution, with less cold spots due to field cancellation effect. 7G: Graphical depiction of the waveform output for 1 stimulating+1 ground or 2 in-phase stimulating+1 ground scenarios. The single or overlapping (in-phase) waveforms result in limited electric field distribution. 7H: In contrast, the phase-shift IMT scenario, with a 120-degree offset between waveforms, produces a broad, dynamically-oriented electric field. 7I: Electric volume histograms of IMT field coverage with each of the stimulation scenarios. Only the phase-shift 3-electrode configuration reached a 1 V/cm threshold known to impact HGG viability across nearly 100% of the culturing well.

Phase-shifting markedly enhances IMT electric field distribution. The computer simulation modeled various electrode configurations and treatment parameters that could be evaluated using the newly fabricated IMT device for patient HGG spheroids and organoids (FIG. 7). Specifically, these studies compared the electric field distribution and amplitude resulting from a single stimulating electrode versus a multi-electrode strategy that more accurately reflects the clinical vision of IMT. The 3-electrode construct used here provides the simplest form of multi-electrode IMT that can accommodate a phase-shift approach and create a dynamically rotating electric field about the central axis of the construct. The geometry of the hardware was replicated in COMSOL with 2 or 3 biocompatible platinum stimulating or ground electrodes. The electric field threshold of 1 V/cm is recognized as effective in GBM and was used as an exemplary measure of IMT coverage for each electrode configuration.[10-12] Based on the EVH analysis, this amplitude was achieved across 99% of the target treatment volume (i.e., culture well) using the phase-shift, multi-electrode configuration, compared to 55% and 63% coverage using 2-electrode and 3-electrode stimulation without phase-shift, respectively. Similarly, the volume percentage covered by 2 V/cm for the 2-electrode, 3-electrode without and with phase-shift was 23%, 30%, and 68% respectively. Of the 3 configurations, only the phase-shift, multi-electrode stimulation produced symmetric, dynamically rotating electric fields (FIG. 7).

Patient demographics and HGG specimens. Ten patients provided HGG specimens for this study (3 male: 7 female, age 29-75 years). All tumors were supratentorial in location. Of the 9 HGG tumors diagnosed as GBM, 8 were de novo and 1 transformed from an anaplastic astrocytoma which had been treated with surgery and chemoradiation 2 years prior. The remaining tumor sample was obtained from a stereotactic biopsy in the youngest patient, who had no tumor history, and diagnosed as anaplastic astrocytoma (Table 1).

Figures 10A, 10B, 10C:
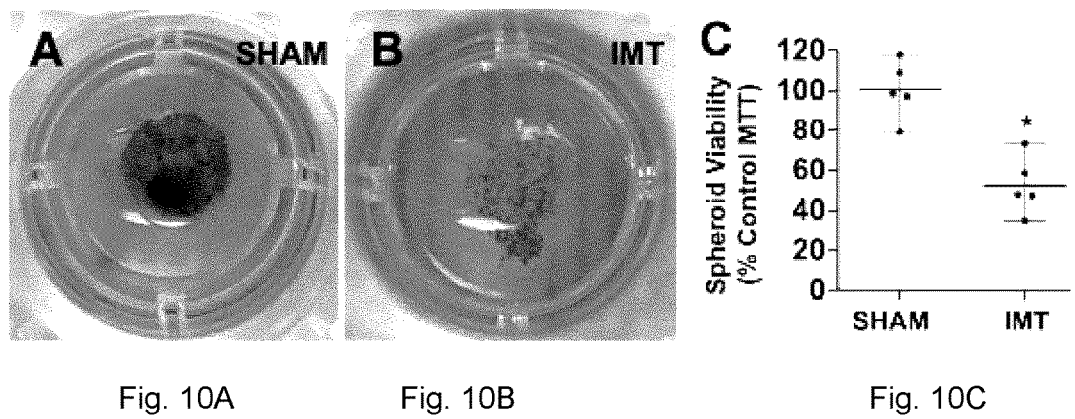
FIG. 10. Phase-shift IMT reduces patient HGG spheroid viability. 10A, 10B: Representative photographs showing the MTT assay in 3D HGG spheroids following 3-day exposure to sham or IMT conditions, as indicated. Note the dramatic reduction of the dark Formosan MTT product, consistent with viability loss, following IMT 10C: MTT measures were normalized to the respective no-hardware control values and revealed ~50% reduction in HGG spheroid viability with IMT compared to sham (n=5, *p<0.001). Individual values are shown together with the cohort mean (horizontal line)±SD. BLI reveals the robust impact of IMT in patient-derived HGG spheroids. D: Peak BLI signal from patient-derived HGG spheroids following 3-day exposure to sham or IMT conditions. There was a dramatic loss of signal intensity following dynamic field IMT compared to sham treatment in all specimens. E: BLI measures were normalized to the respective no hardware control values and revealed >80% reduction in HGG spheroid viability with IMT compared to sham (n=5, *p >0.001). Individual values are shown together with the cohort mean (horizontal line) ±SD.
Figures 10D, 10E:
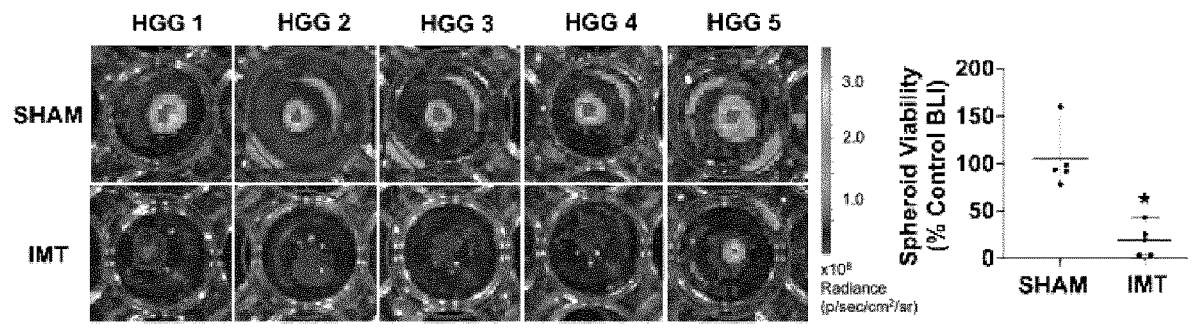

Evidence of HGG spheroid response to IMT. The HGG spheroid model enabled the first multi-modality assessment of IMT impact within a 3D tumor environment. Spheroids were created in triplicate for parallel 3-day exposure to 1. no hardware control, 2. sham and 3. IMT conditions. Based on superior field coverage revealed by the computer simulation data, the 3-electrode construct was applied using phase-shifted sinusoidal output of 4V peak-to-peak at a frequency of 200 kHz. Five biological replicates were assessed using MTT and BLI with sham and IMT values normalized to the corresponding no hardware control measures. The MTT assay revealed marked viability loss following IMT compared to sham (52.2±6.4%:100.4±6.5% of no hardware control values, respectively; n=5; p<0.001; FIGS. 10A-10C). The BLI intensity measured in an independent series revealed consistently dramatic loss of viability following IMT compared to sham treatment (18.9±16.6%:105±32% of control values, respectively; n=5; p >0.001). No overtly recalcitrant tumors were identified, including the anaplastic astrocytoma in patient 1 and recurrent GBM in patient 5 which were both exquisitely sensitive to IMT (FIGS. 10D and 10E).

Solid GBM organoids are highly sensitive to phase-shift IMT that does not injure normal brain parenchyma. A 3-day parallel period of no hardware control, sham or IMT conditions was implemented with 5 biologically distinct HGG organoids, all GBM in this series, followed by evaluation with MTT densitometry to estimate tissue viability. Consistent with the spheroid data, naïve GBM organoids exhibited marked sensitivity to multi-electrode, phase-shift IMT. The post-treatment MTT density was visibly reduced following IMT. The impact did not appear ablative and margins of the tumor fragments remained delineated. Organoid viability measures decreased to 58.1+/−14.7% compared to 101.4+/− 11.7% of control values following IMT or sham conditions, respectively (n=5; p=0.003; FIG. 23A-23B). A control cohort of Fischer rats (n=3) was then used to determine if the new multi-electrode, phase-shift IMT parameters would produce overt functional deficits or parenchymal injury in normal (i.e., non-tumor-bearing) living brain. During a 1-week trial of dynamic field IMT, the animals exhibited no changes in feeding, grooming, sleeping, nor any overt seizures or motor weakness. The postmortem histology revealed expected parenchymal disruption along the electrode tracts with no signs of electrolysis or substantial hemorrhage in either sham or IMT-treated hemispheres (FIG. 24).

The results demonstrated robust advantage in achieving planned electric field amplitudes and distributions using multiple compared to single electrode IMT systems. The transition to a phase-shifted output waveform to create dynamically-oriented electric fields further dramatically improved tumor coverage. Optimized, phase-shifted IMT parameters produced significant reduction of tumor cell viability in patient-derived HGG spheroids and solid organoids without overt neurological effects or tissue electrolysis in normal living brain.

Conclusion

This study provided the first simulation and validation platform for multi-electrode IMT in 3D patient-derived HGG models. These efforts demonstrated the dramatic field distribution advantage of multiple versus single electrodes, and of phase-shift versus in-phase output waveforms. The computer simulation allowed comparison of treatment strategies in these proof-of-concept preclinical models that sets groundwork for advances in electrotherapy planning systems for CNS cancer. The demonstration that multiple electrodes provide greater tumor coverage than a single electrode is perhaps intuitive; however, the delivery of such complex electric fields requires careful programming to avoid untoward cumulative or cancellation effects.[4] These challenges may be mitigated by phase-shifting, or temporally offsetting, output waveforms to create dynamically-oriented electric fields that produce broader coverage than with in-phase delivery. The current stimulation parameters did not produce overt injury to normal living brain but yielded powerful control of human HGG spheroids and naive GBM organoids, providing resounding evidence of therapeutic potential.

This example sheds new light on the potential of electric field treatment for CNS cancer and introduces the utility of phase-shifted waveforms to produce broad, consistent tumor coverage. It offers a novel demonstration of computer simulation, programming and efficacy of dynamic field IMT in patient-derived HGG. Within the limits of the treatment models, the current multi-modality analysis provides compelling evidence of IMT susceptibility in patient glioma specimens without harmful effects in normal living brain. The essential next steps in the translational pipeline will be definition of key technical elements and impact of dynamic field therapy in vivo and in combination with chemotherapy and radiation. The present data support the intriguing prospect of IMT-based strategies in neuro-oncology.

We have shown that a single bioelectrode construct can produce a significant tumor reduction in animal models but emits fields that cover only a small fraction of the actual tumor volume. Our modeling of multi-lead IMT constructs predict a far greater, essentially complete, tumor coverage expected to produce optimized therapeutic impact.

Example 3

Optimizing IMT Field Coverage.

Figure 8:
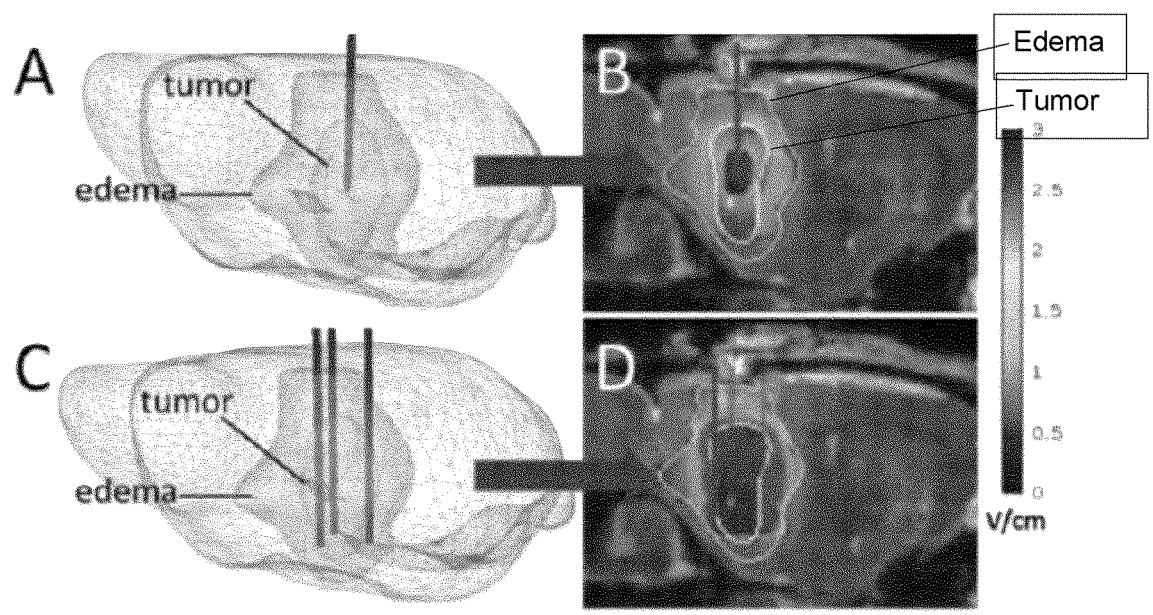
FIG. 8. Optimizing IMT field coverage. Panel A: Three-dimensional rendering of a tumor in the rodent brain shown in Panel B (oblique sagittal) being treated with one electrode IMT system. Panel B: MRI of the rat brain of panel A showing about 25% tumor coverage. Panel C: Three-dimensional rendering of a tumor in the rodent brain shown in Panel D (oblique sagittal) being treated with muli-bioelectrodes (three bioelectrodes in this example) IMT system. Panel D: MRI of the rat brain of FIG. 8, panel C showing 100% tumor coverage.

With reference to FIGS. 8A and 8B, our 1-bioelectrode IMT system yielded <25% GBM coverage, shown here on the rat brain MRI (FIG. 8B). With reference to FIGS. 8C and 8D, the dynamic multi-bioelectrode IMT device for rodents yields about 100% tumor coverage. The IMT field is indicated by the color spectrum. This new relative pulse offset IMT strategy emulates multi-electrode IMT planned for humans (FIGS. 14, 15).

Example 4

Multielectrode Dynamic IMT Robustly Reduces GBM In Vivo.

Figures 9A, 9B, 9C:
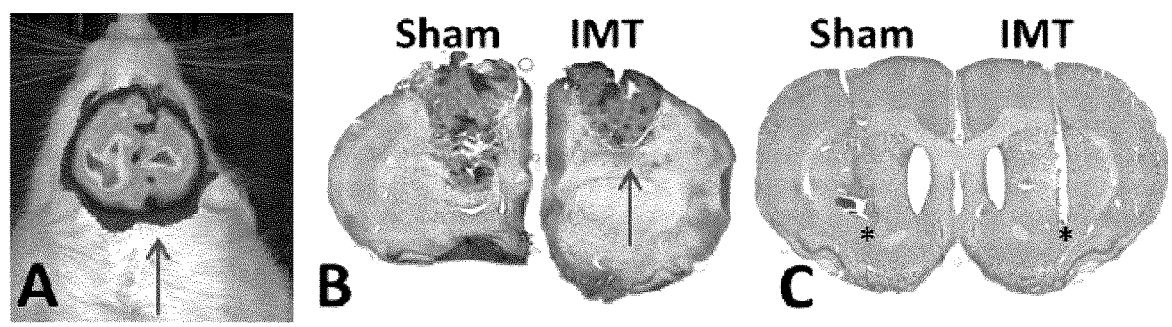
FIG. 9. Multielectrode dynamic IMT robustly reduces GBM in vivo. 9A: Blue light imaging (BLI) histology image of a Fischer rat with bilateral GBM, one side of the GBM treated with 7-day multi-lead dynamic IMT (sinusoidal, +/−2V, 200 kHz) (arrow), the other side received sham treatment. 9B: Thionine histology of FIG. 9B showing sham and IMT treated sides. 9C: image of control rat brain treated with IMT or sham, shown at the bioelectrode tracts. No overt injury to normal brain resulted from IMT. Asterisks=tract tip.

This study shows in FIG. 9A BLI and 9B thionine histology from a Fischer rat with bilateral GBM randomized to 7-day multi-lead dynamic IMT (arrow, sinusoidal, +/−2V. 200 kHz) or sham. FIG. 9C Control brain without tumor treated with IMT or sham, shown at the bioelectrode tracts. No overt injury to normal brain resulted from IMT. Asterisks=tract tip.

This study has demonstrated the efficacy of the novel, optimized IMT parameters. Moreover, we have shown that the new IMT parameters and bioelectrode construct does not produce harmful side effects or injury when applied to normal brain tissue.

Example 5

Results of Dynamic IMT Device in Our 3D GBM Model.

Figure 11:
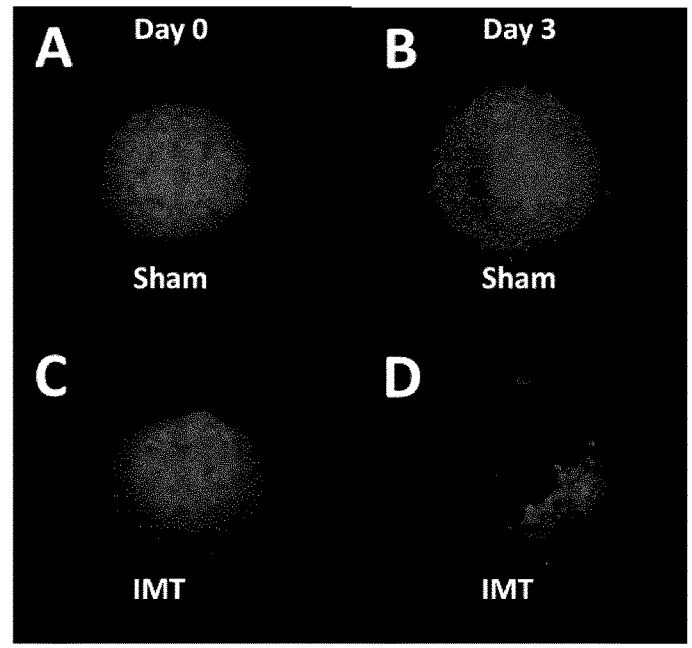
FIG. 11. Dynamic IMT device in 3D GBM model. Patient GBM cells have been engineered to express a red fluorescent marker. Panel A and Panel B Sham or Panel C and Panel D IMT treatment effects at day 0 (initiation day) or after 3 days. The sham-treated tumours flourish however note the dramatic loss of GBM cell viability after 3 days of low-intensity IMT in this 3D model using the surgical IMT device (FIG. 11, panel D).

Patient GBM cells have been engineered to express a red fluorescent marker. DIPG cells would be similarly modified. FIG. 11A, 11B Sham or 11C, 11D IMT treatment effects at day 0 (initiation day) or after 3 days. The sham-treated tumours flourish however note the dramatic loss of GBM cell viability after 3 days of low-intensity IMT in this 3D model using the surgical IMT device (panel 11D).

Example 6

3D GBM Tumor Viability is Markedly Reduced after Dynamic IMT.

Figures 12A, 12B:
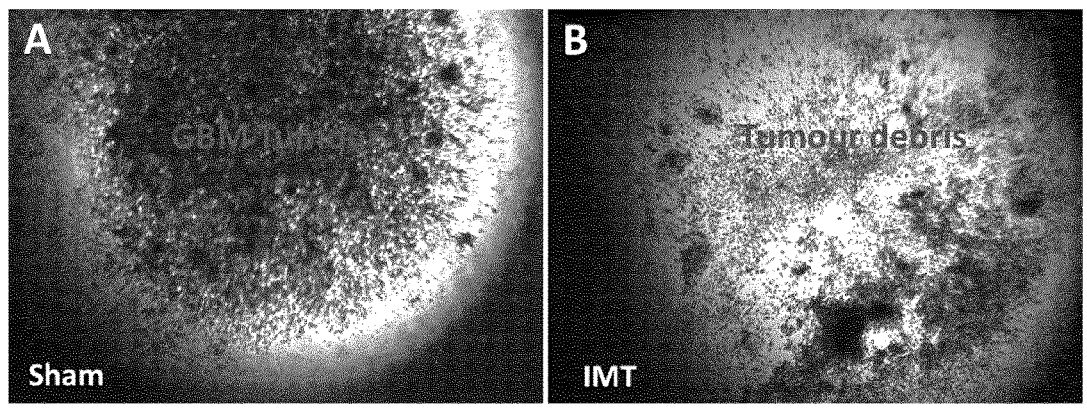
FIG. 12. 3D GBM tumor viability is markedly reduced after dynamic IMT. Shown are 3D patient-derived GBM tumours after 3 days of sham treatment (12A) or IMT treatment (12B) using the surgical IMT device. IMT was delivered using dynamic stimulation designed according to the present disclosure. There was a marked loss of cell viability with IMT (FIG. 12B).

FIG. 12 illustrate 3D patient-derived GBM tumours after 3 days of 12A) sham or 12B) IMT using the surgical IMT device. IMT was delivered using relative pulse offset stimulation designed by our team. There was a marked loss of cell viability with IMT. These low-intensity parameters have been previously shown to be non-injurious to the normal living brain.

Example 7

Quantification of 3D Dynamic IMT Effect.

Figures 13A, 13B:
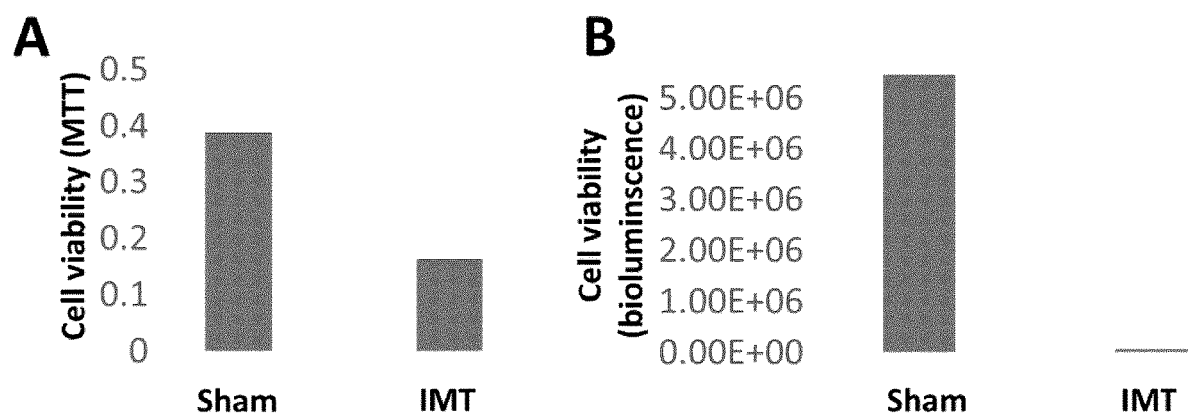
FIG. 13. Quantification of 3D dynamic IMT effect. Two methods of quantifying GBM cell viability were used after sham or IMT treatment in the 3D model using the surgical IMT device. 13A MTT colorimetric assay and 13B bioluminescence technologies are independent methods of measuring cell viability. Both methods demonstrated a marked reduction in GBM viability after 3 days of IMT compared to sham conditions.

Two methods of quantifying GBM cell viability were used after sham or IMT treatment in the 3D model using the surgical IMT device. FIG. 13A MTT viability assay and 13B bioluminescence technologies are independent methods of measuring cell viability. Both methods demonstrated a marked reduction in GBM viability after 3 days of IMT compared to sham conditions.

Example 8

Multi-Electrode Dynamic IMT for Unresectable HGG.

FIG. 14A MRI plan with IMT leads guided through a burrhole (white circle at top) into a brainstem HGG (arrow). Other trajectories are possible, as guided by tumor anatomy. 14B Pre-treatment simulation to calculate optimal field parameters. 14C IMT field spanning the tumor to provide sustained, titratable therapy.

Example 9

Dynamic IMT Simulation.

The unresectable GBM shown in FIG. 15A could have been accessed with minimally invasive surgery for comprehensive IMT field coverage. GBM cells, differentiated and stem, from this biopsied tumor were highly sensitive to IMT (not shown). Coronal MRI shows GBM (arrows): 15A contrast uptake with B overlay of robust IMT fields (spectral color) spanning the tumor region and surrounding brain using multiple bioelectrodes (white) and stimulation parameters proven effective in GBM and safe in normal brain.

Figure 21A:
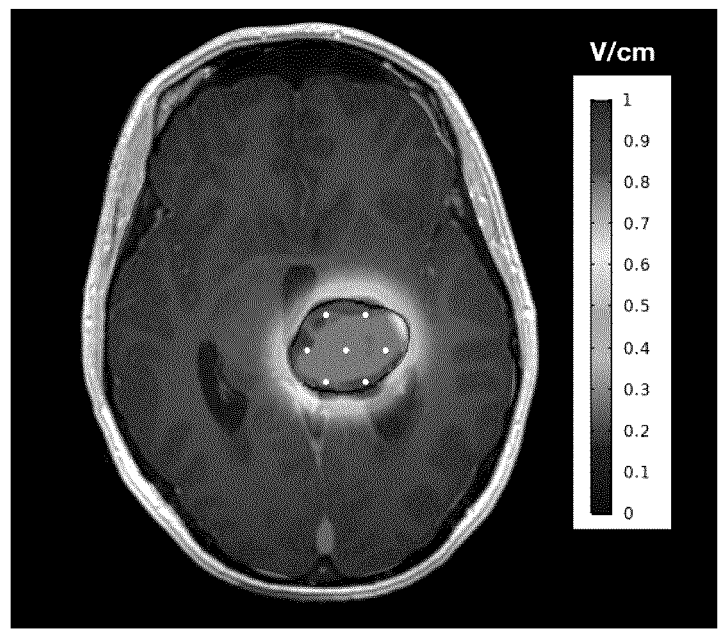
FIG. 21. Magnetic Resonance Images (MRI) of sample patient 7 electrode implant optimization results. 21A: horizontal plane. 21B: sagittal plane. 21C: coronal plane.
Figure 21B:
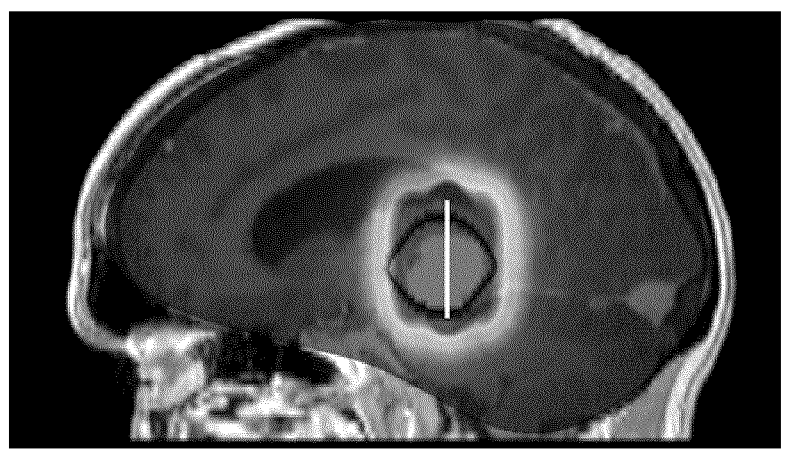
Figure 21C:
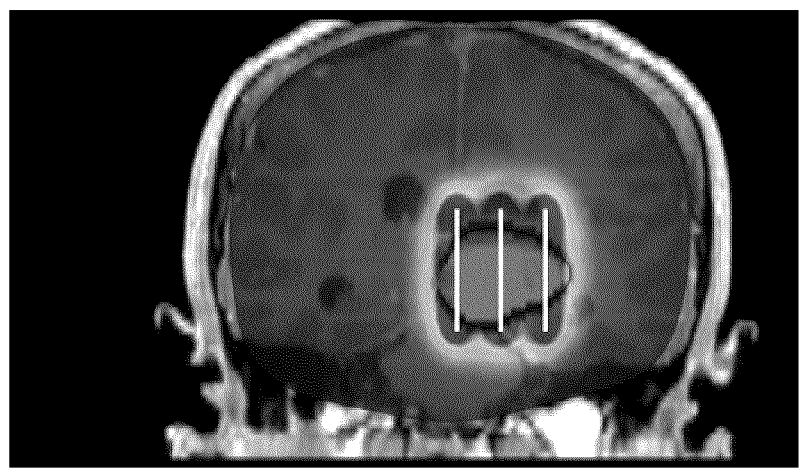

FIGS. 21A-C illustrate sample patient 7-electrode implant optimization results.

Example 10—Optimization Accounting for Organs at Risk (OAR)/Normal Tissue

One aspect of the present disclosure is to maximize coverage to tumor while minimizing field coverage to OAR or normal tissue.

Average electric field in tumor volume:

$$\overline{E}_j = \frac{1}{N_t} \sum_{i \in t} E_{i,j}$$

Average electric field in OAR volume:

$$\overline{E}_k = \frac{1}{N_{OAR}} \sum_{i \in OAR} E_{i,k}$$

The optimization objective function is given by:

$$f = \frac{1}{N_s} \sum_{j \in s} \Theta(E_{pres} - \overline{E}_j)(\overline{E}_j - E_{pres})^2 + w \frac{1}{N_{OAR}} \sum_{k \in OAR} \overline{E}_k^2$$

Tissue Sparing

The optimization algorithm was applied to a tissue sparing example, where a 2.5 cm diameter spherical tumor was intersected by a 1.8 cm diameter cylindrical organ to be spared, creating a non-spherical target volume. The weighing factor in the objective G was set to w=0.1 in this example. A full location and relative phase shift optimization of a 5-electrode single contact model was implemented in this investigation.

Figure 17A:
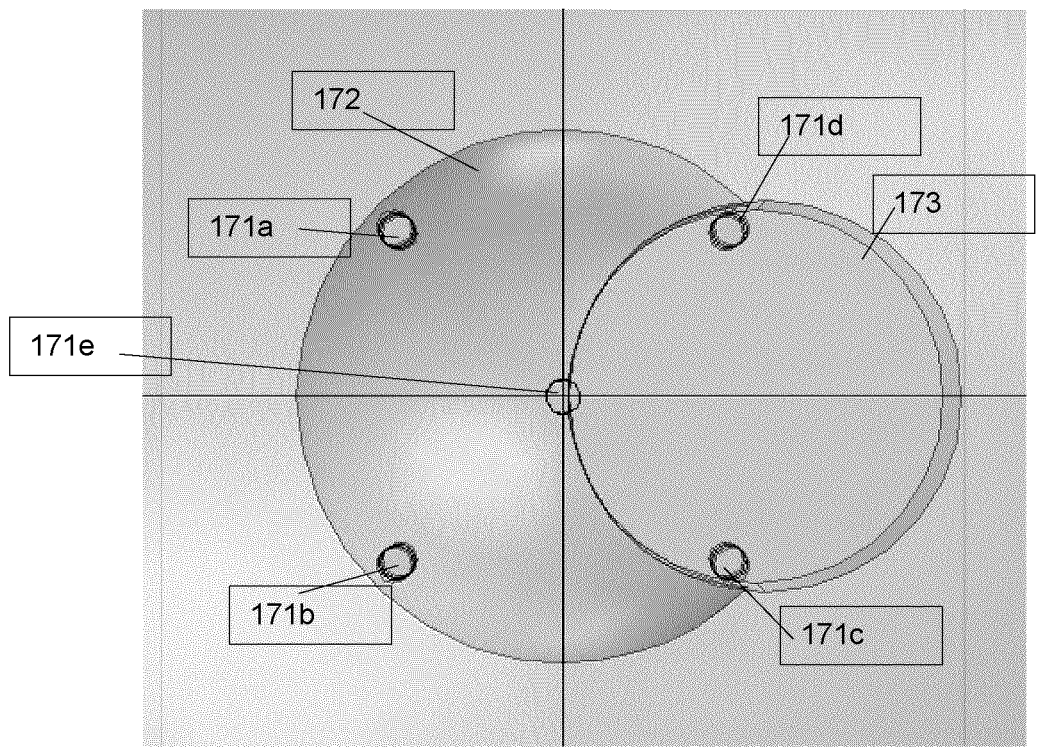
FIG. 17. 17A: Model showing the geometry of 5 electrodes (171a, b, c, d, e), one contact per electrode, initially placed in a tumor partially wrapping around an organ at risk ("OAR"). The tumor 172 partially wraps around the OAR 173. 17B: Geometry of an optimized 5 electrode (171a, b, c, d, e), one contact per electrode optimally placed in the tumor that partially wraps around the OAR. 17C: Average temporal electric field maps of field coverage over time for 5 optimally placed electrodes with single contact in cross sections of corresponding maximum tumor volumes 172 and normal tissue 173 (black circles). 17D: Electric field volume cumulative histogram of the tumor volume and the OAR volume receiving at least a certain temporal average electric field value (V/cm) of optimized dynamic.
Figure 17B:
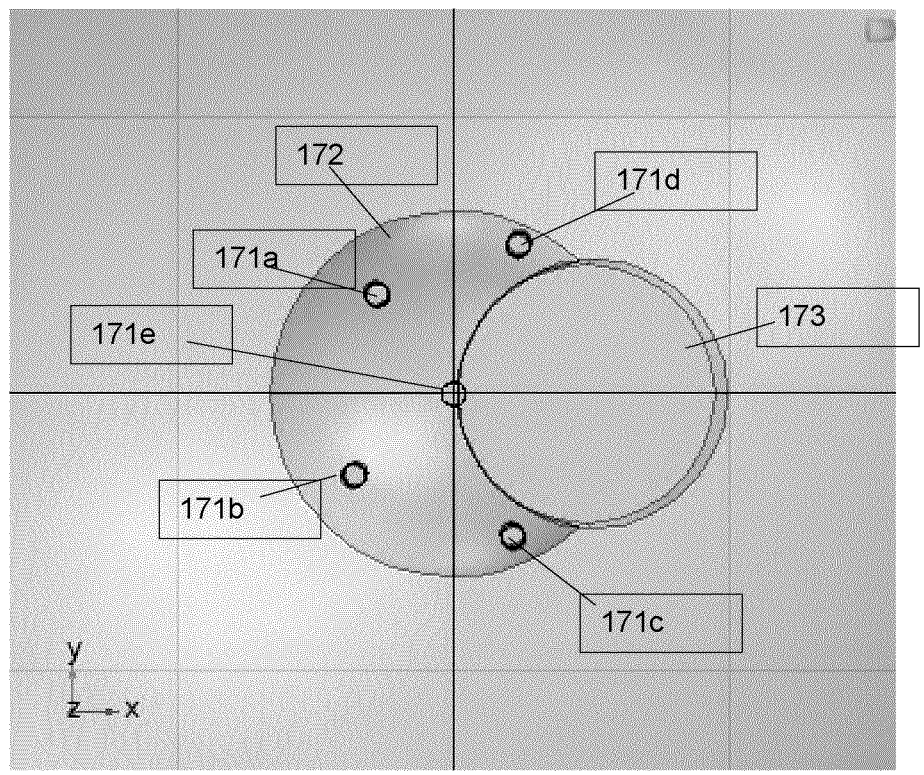

FIG. 17A illustrates a 5 electrode 171a-e, single contact model with an OAR before optimization. FIG. 17B illustrates a 5 electrode 171a-e, single contact optimized model with an OAR. The tumor's 172 diameter is 2.5 cm, intersected with a 1.8 cm diameter cylinder OAR 172. w=0.1.

In the objective function is a weighting factor w that a user sets to inform the optimization algorithm how important it is to spare the OAR compared to covering the tumor with the prescribed electric field.

The optimization parameters used in this study were the location of each electrode (r, 9), and the phase shift of each electrode contacts input waveform.

Objective function value start: 0.3506

Objective final: 0.0200

Iterations: 203

φ=0.237 5.007 1.538 6.030 r=0 11.125 8.563 8.75 10.5

θ=1.162 2.225 3.829 5.105

Figure 17C:
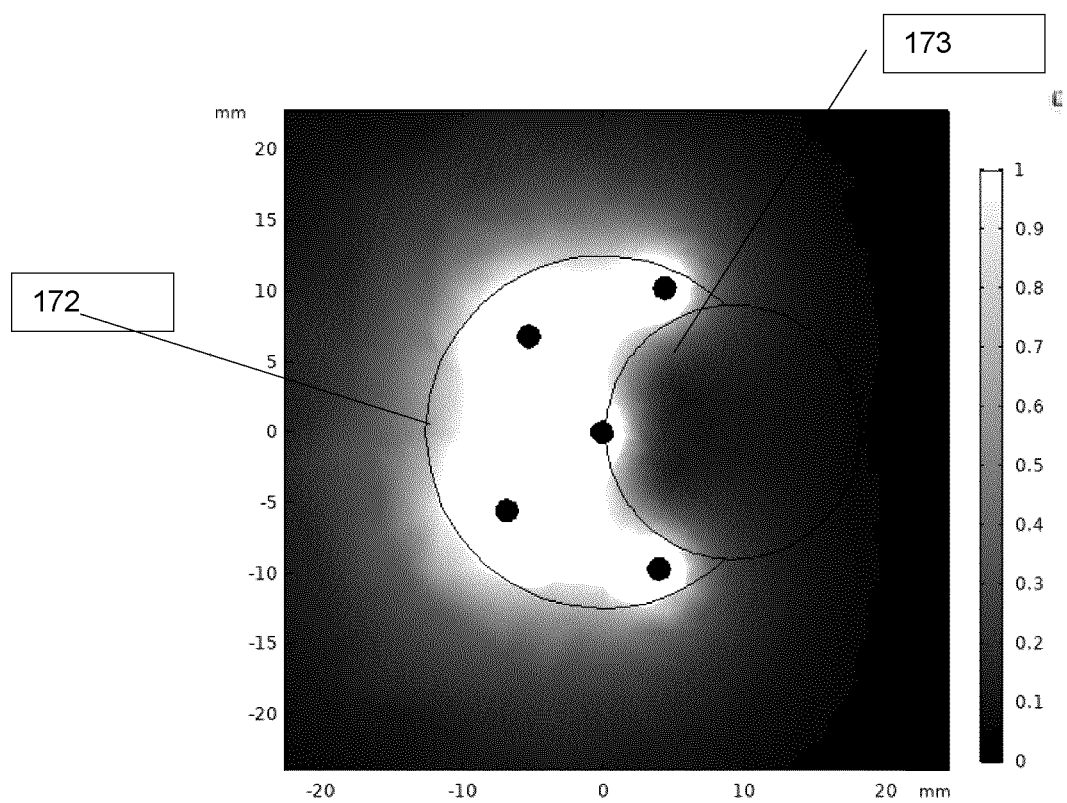
Figure 17D:
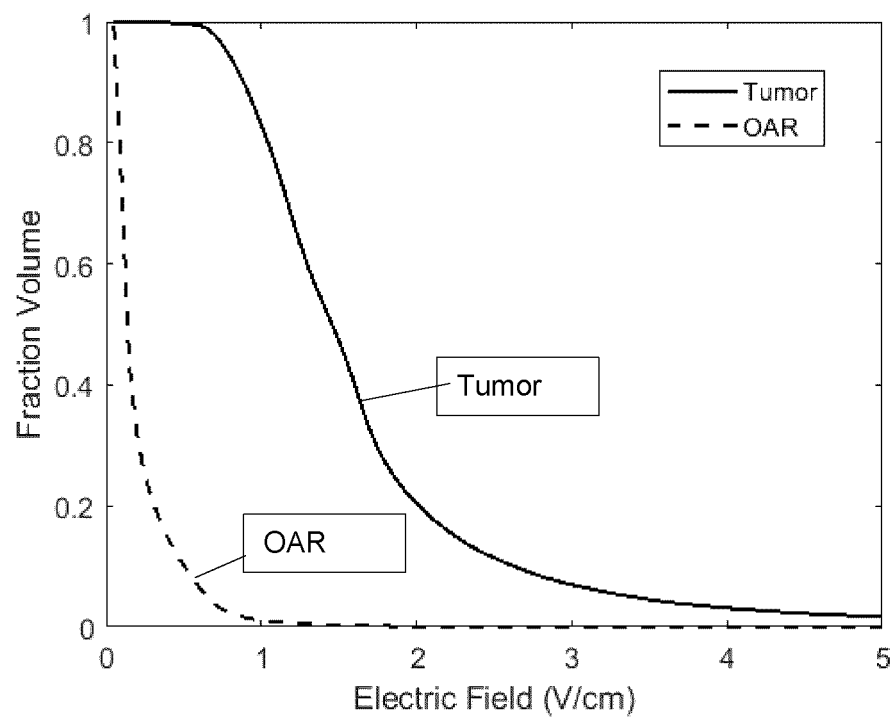

As seen in FIGS. 17C and 17D, the field tumor coverage is maximized, while the majority of the electric field is excluded from the OAR (contrast this with FIG. 3 (a)(iv) where no OAR was specified). The field at the boundary of the OAR/tumor can be further reduced by increasing the weight w but this will come at the expense of tumor coverage.

Our algorithm was applied to the tissue sparing example, where optimal electrode placements (r,θ) were found to be (0,0), (11,0.37), (9,0.75 π), (9,1.25 π), and (11,1.63 π). Optimal phase shifts were 0, 0.10 π, 1.55 π, 0.45 π, and 1.9 π radians. The input voltage required to ensure 95% of the tumor volume was covered by 95% of 1 V/cm was 2.4 V. The time average electric field map of the optimized configuration and corresponding EVH (FIGS. 17C and 17D) highlight the coverage of the tumor volume with 1 V/cm electric field, while minimizing the field to the spared tissue.

Figure 18A:
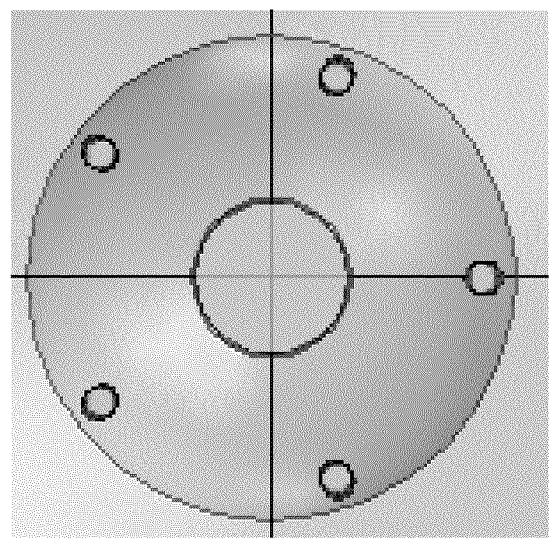
FIG. 18. 18A: Model showing the configuration of 5 electrodes, one contact per electrode for a tumor completely wrapping around an organ at risk. 18B: average temporal electric field maps of field coverage over time for 5 optimally placed electrodes with single contacts.
Figure 18B:
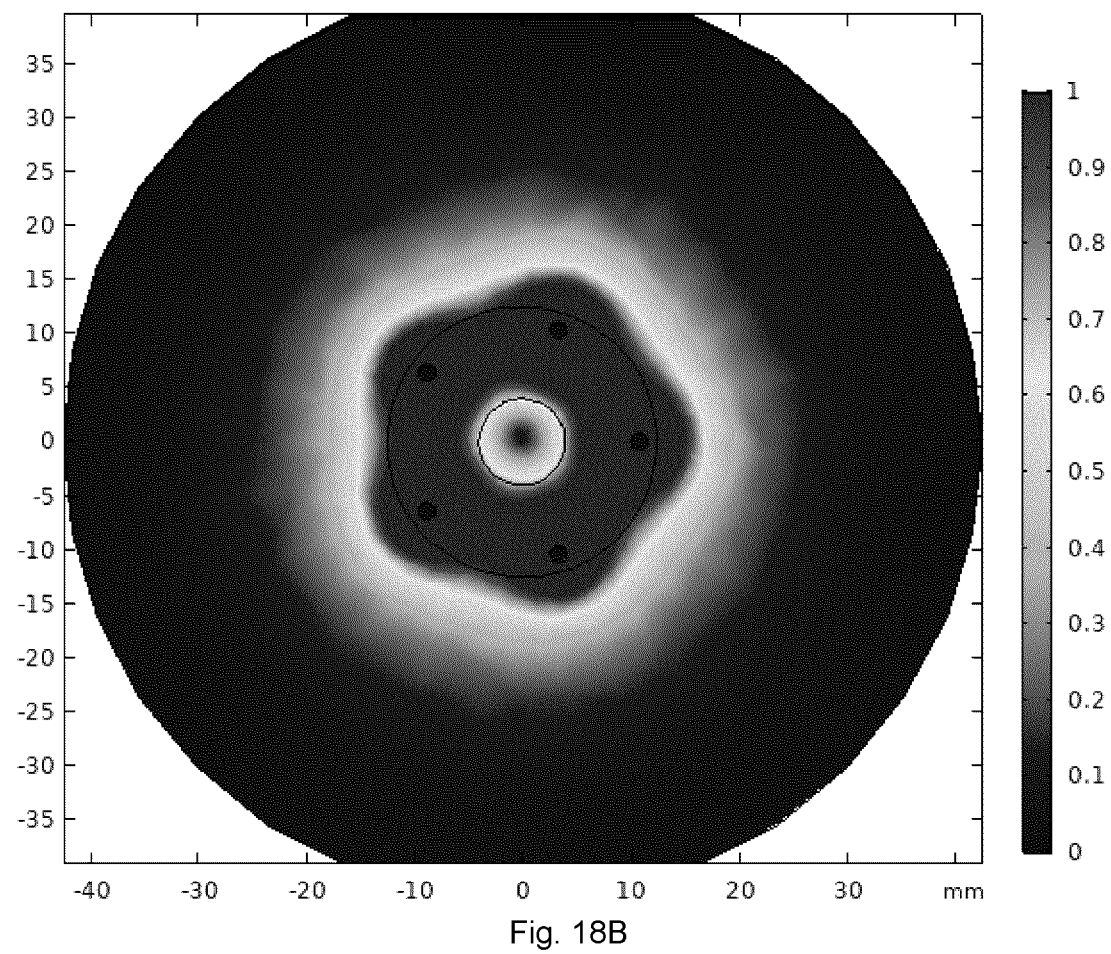

Our algorithm for relative phase shift optimization and electrode configuration was also applied in a case where the tumor is completely wrapping around the OAR. FIG. 18A illustrate the electrode configuration, and FIG. 18B illustrate the time average field.

Figure 22A:
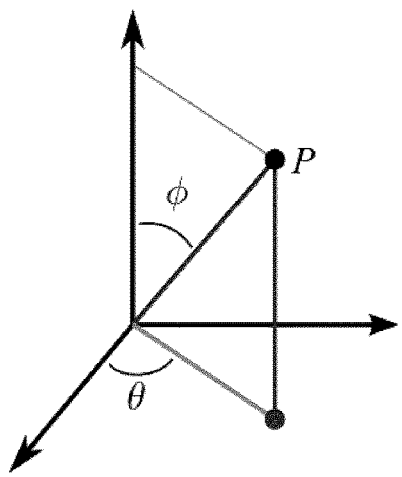
FIG. 22. For more realistic electrode implant trajectories, parallel electrode insertion directions can be replaced by a common insertion location (x,y,z) located at the skull with each electrode angled specified by a set of two angles ($\theta$, $\phi$). 22A: angles specifying electrode insertion direction. 22B: specification of the insertion coordinates and electrode angle. 22C: caudal (top) view of a patient's skull showing the trajectory of electrode specified in 22B. 22D: corresponding sagittal view of the electrode trajectory. The optimization will also include the electrode angles that lead to optimal separation of electrodes for the generation of electric fields to cover the entire tumour volume.
Figure 22B:
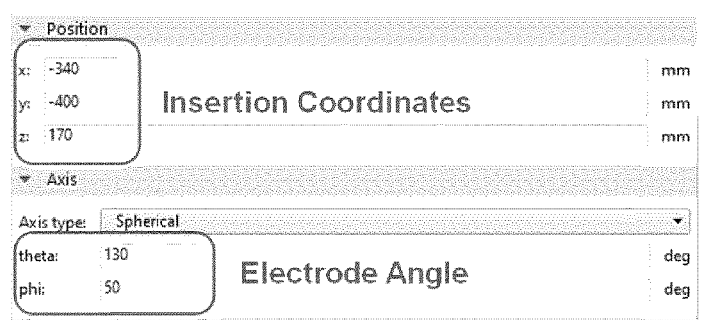
Figure 22C:
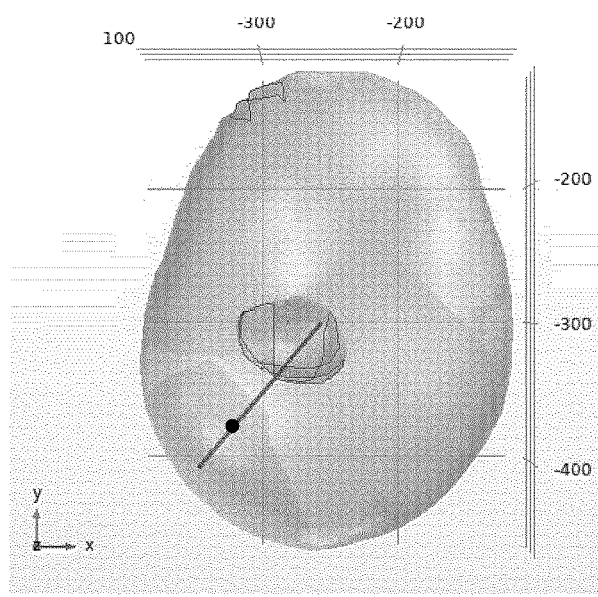
Figure 22D:
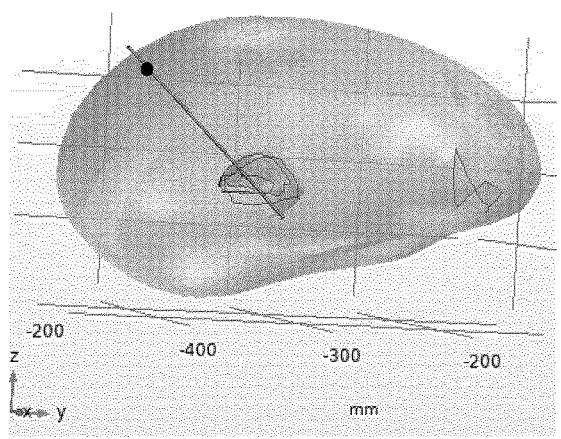

The parallel electrode locations can be replaced in the algorithm with a common insertion location at the skull with each electrode angled specified by two angles for more realistic electrode implant trajectories (see FIG. 22A-22D). Angled electrode insertions are specified by angles (θ,φ) and insertion coordinates (x,y,z). FIG. 22A illustrates the angles specifying electrode insertion direction. FIG. 22B shows the specification of the insertion coordinates and electrode angle. FIG. 22C is a caudal (top) view of a patient's skull showing the trajectory of electrode specified in 22B and FIG. 22D is the corresponding sagittal view of the electrode trajectory. The optimization will also include the electrode angles that lead to optimal separation of electrodes for the generation of electric fields to cover the entire tumour volume. The optimization will also include the electrode angles that lead to optimal separation of electrodes for the generation of electric fields to cover the entire tumour volume.

TABLE 1

Patient and Tumor Characteristics

| P. # | Age | Sex | Tumor location (Side) | Tumor model | Diagnosis | IDH1 R132H mutation | Nuclear ATRX retained | EGFR amplified (Polysomy 7) |
|---|---|---|---|---|---|---|---|---|
| 1 | 29 | F | Splenium (left) | S | Anaplastic astrocytoma | No | No | No (yes) |
| 2 | 65 | F | Parietal (right) | S | Glioblastoma | No | No data | No data |
| 3 | 66 | F | Parietal (right) | S | Glioblastoma | No | Yes | No (yes) |
| 4 | 67 | F | Temporo-parietal (right) | S | Glioblastoma | No | Yes | Yes (yes) |
| 5 | 39 | M | Fronto-temporal (right) | S | Glioblastoma *was anaplastic astrocytoma 2 years prior with surgery and chemoradiation | Yes | No data | No (yes) |
| 6 | 56 | F | Hypothalamic (right) | O | Glioblastoma | No | Yes | No (yes) |
| 7 | 49 | F | Temporal (left) | O | Glioblastoma | Yes | No | No (yes) |
| 8 | 65 | M | Parietal (right) | O | Glioblastoma | No | Yes | No (yes) |
| 9 | 54 | F | Frontal (right) | O | Glioblastoma | No | Yes | Yes (yes) |
| 10 | 75 | M | Frontal (left) | O | Glioblastoma | No | Yes | No data |

Abbreviations in Table 1: "P. #": Patient number; "M": male; "F": female; "O": organoid; "S": spheroid.

REFERENCES

[1] H. Xu, F. Bihari, S. Whitehead, E. Wong, S. Schmid, and M. O. Hebb, "In vitro validation of intratumoral modulation therapy for glioblastoma," Anticancer Res., vol. 36, no. 1, pp. 71-80, 2016.

[2] A. R. Di Sebastiano et al., "Preclinical outcomes of Intratumoral Modulation Therapy for glioblastoma.," Sci. Rep., vol. 8, no. 1, p. 7301, May 2018.

[3] A. Deweyert, E. Iredale, H. Xu, E. Wong, S. Schmid, and M. O. Hebb, "Diffuse intrinsic pontine glioma cells are vulnerable to low intensity electric fields delivered by intratumoral modulation therapy," J. Neurooncol., vol. 143, no. 1, pp. 49-56, May 2019.

[4] C. Gabriel, A. Peyman, and E. H. Grant, "Electrical conductivity of tissue at frequencies below 1 MHz," Phys. Med. Biol., vol. 54, no. 16, pp. 4863-4878, August 2009.

[5] J. Latikka, T. Kuurne, and H. Eskola, "Conductivity of living intracranial tissues.," Phys. Med. Biol., vol. 46, no. 6, pp. 1611-6, June 2001.

[6] R. D. Stoy, K. R. Foster, and H. P. Schwant, "Dielectric properties of mammalian tissues from 0.1 to 100 MHz: a summary of recent data," 1982.

[7] J. Latikka and H. Eskola, "The Resistivity of Human Brain Tumours In Vivo.," Ann. Biomed. Eng., vol. 47, no. 3, pp. 706-713, March 2019.

[8] U. De Giorgi et al., "Circulating Tumor Cells and [$^{18}$F]Fluorodeoxyglucose Positron Emission Tomography/Computed Tomography for Outcome Prediction in Metastatic Breast Cancer," J. Clin. Oncol., vol. 27, no. 20, pp. 3303-3311, July 2009.

[9] C. Wenger, R. Salvador, P. J. Basser, and P. C. Miranda, "The electric field distribution in the brain during TTFields therapy and its dependence on tissue dielectric properties and anatomy: A computational study," Phys. Med. Biol., vol. 60, no. 18, pp. 7339-7357, 2015.

[10] C. Wenger, R. Salvador, P. J. Basser, and P. C. Miranda, "Improving Tumor Treating Fields Treatment Efficacy in Patients With Glioblastoma Using Personalized Array Layouts," Int. J. Radiat. Oncol., vol. 94, no. 5, pp. 1137-1143, April 2016.

[11] A. Amon and F. Alesch, "Systems for deep brain stimulation: review of technical features," J. Neural Transm., vol. 124, no. 9, pp. 1083-1091, September 2017.

[12] D. N. Anderson, B. Osting, J. Vorwerk, A. D. Dorval, and C. R. Butson, "Optimized programming algorithm for cylindrical and directional deep brain stimulation electrodes," J. Neural Eng., vol. 15, no. 2, p. 026005, April 2018.

[13] C. R. Butson and C. C. McIntyre, "Role of electrode design on the volume of tissue activated during deep brain stimulation.," J. Neural Eng., vol. 3, no. 1, pp. 1-8, March 2006.

[14] F. Alonso, M. A. Latorre, N. Göransson, P. Zsigmond, and K. Wårdell, "Investigation into Deep Brain Stimulation Lead Designs: A Patient-Specific Simulation Study.," Brain Sci., vol. 6, no. 3, p. 39, September 2016.

[15] S. Amaran, N. V. Sahinidis, B. Sharda, and S. J. Bury, "Simulation optimization: a review of algorithms and applications," Ann. Oper. Res., vol. 240, no. 1, pp. 351-380, May 2016.

[16] S. L. Morgan-Fletcher, "Prescribing, Recording and Reporting Photon Beam Therapy (Supplement to ICRU Report 50), ICRU Report 62. ICRU, pp. ix+52, 1999 (ICRU Bethesda, MD) $65.00 ISBN 0-913394-61-0," Br. J. Radiol., vol. 74, no. 879, pp. 294-294, March 2001.

References Cited in Example 2

1. Hu X, Bihari F, Whitehead S, et al. In vitro validation of intratumoral modulation therapy for glioblastoma. Anticancer Res. 2016; 36: 71-80.

2. Di Sebastiano A R, Deweyert A, Benoit S, et al. Preclinical outcomes of intratumoral modulation therapy for glioblastoma. Sci. Rep. 2018; 8(1):7301.

3. Deweyert A, Iredale E, Xu Hu, et al. Diffuse intrinsic pontine glioma cells are vulnerable to low intensity electric fields delivered by intratumoral modulation therapy. J Neurooncol. 2019; 143: 49-56.

4. Iredale E, Deweyert A, Hoover D A, et al. Optimization of multi-electrode implant configurations and programming for the delivery of non-ablative electric fields in intratumoral modulation therapy. Med Phys. 2020; 47(11): 5441-5454.
5. Parkins K M, Dubois V P, Kelly J J, et al. Engineering circulating tumor cells as novel cancer theranostics. Theranostics. 2020; 10(17): 7925-7937.
6. Hamilton A, Foster P J, Ronald J A. Evaluating non-integrating lentiviruses as safe vectors for noninvasive reporter-based molecular imaging of multipotent mesenchymal stem cells. Hum Gene Ther. 2018; 9(10): 1213-1225.
7. Taghian T. 2015. Interaction of an electric field with vascular cells. Avaliable at https://etd.ohiolink.edu/. Accessed Dec. 27, 2020.
8. Arnold W M, Fuhr G. Increasing the permittivity and conductivity of cellular electromanipulation media [abstract]. Proceedings of 1994 IEEE Industry
Applications Society Annual Meeting. 1994; 2:1470-1476.
9. Chen M T, Jiang C, Vernier P T, et al. Two-dimensional nanosecond electric field mapping based on cell electropermeabilization. PMC Biophys. 2009; 2(1): 9.
10. Latikka J, Eskola H. The resistivity of human brain tumours in vivo. Ann Biomed Eng. 2019; 47(3): 706-713.
11. Palti Y. Stimulation of internal organs by means of external applied electrodes. J.
Appl. Physiol. 1966; 21: 1619-1623.
12. Ghiaseddin A P, Shin D, Melnick K, et al. Tumor treating fields in the management of patients with high grade gliomas. Curr. Treat. Options in Oncol. 2020; 21: 76.

The above disclosure generally describes the present invention. Changes in form and substitution of equivalents are contemplated as circumstances may suggest or render expedient. Although specific terms have been employed herein, such terms are intended in a descriptive sense and not for purposes of limitation. Other variations and modifications of the invention are possible. As such modifications or variations are believed to be within the sphere and scope of the invention as defined by the claims appended hereto. All publications cited herein and the priority document are incorporated by reference.

The invention claimed is:

1. A computer optimized method of electric field treatment planning of a target tissue site, the method comprising:
(a) obtaining an image of the target tissue site and storing the image in a computer unit,
(b) determining a volume of the target tissue site and inputting into the computer unit the volume of the target tissue site and one or more electric properties of the target tissue site,
(c) the computer unit generating simulated electric field maps of the target tissue site using configurations of multiple electrodes implanted within the target tissue site, the volume and the electric properties of the target tissue site,
(d) the computer unit using an optimization algorithm and the simulated electric field maps to: (i) determine an optimal number of implantable electrodes to treat the target tissue site with electric fields, the optimal number of implantable electrodes being one or more than one implantable electrodes, each implantable electrode having one or more contacts, (ii) determine an optimal placement of the optimal number of implantable electrodes determined in (i) within the target tissue site, and (iii) determine optimal voltage and optimal phase shift of each of the contacts of the optimal number of implantable electrodes determined in (i) at the optimal placement determined in (ii) that results in a prescribed time average electric field coverage of the entire target tissue site, wherein the electric field is a dynamically oriented electric field,
wherein the optimal placement of the optimal number of implantable electrodes within the target tissue site includes an insertion location and a trajectory angle of the optimal number of implantable electrodes, and
(e) treating the target tissue with electrotherapy by implanting into the target tissue the optimal number of implantable electrodes determined in step (d) (i) at the optimal placement determined in step (d) (ii) and using the optimal voltages and phase shifts of each of the contacts of the optimal number of implantable electrodes determined in step (d) (iii).

2. The method of claim 1, wherein step (b) further comprises segmenting the image to delineate tissue surrounding the target tissue site ("surrounding tissue") and determining volume of the surrounding tissue and inputting into the computer unit one or more electric properties of the surrounding tissue, and wherein step (d) further comprises using the volume and the one or more electric properties of the surrounding tissue to determine (i), (ii) and (iii) that results in the prescribed time average electric field coverage of the entire target tissue site while minimizes coverage of the volume of the surrounding tissue.

3. The method of claim 1, wherein the method further comprises (e) obtaining a post-electrode implant image of the target tissue to visualize an actual position of the implantable electrodes relative to the target tissue site, (f) using the image of (e) to assess the prescribed electric field coverage of the target tissue site, and (g) repeat steps (b) to (f) to optimize the prescribed electric field coverage based on the assessment in (f).

4. The method of claim 1, wherein the target tissue site is non-neoplastic tissue.

5. The method of claim 1, wherein the target tissue site is a tumor or neoplasm.

6. The method of claim 1, wherein the minimum prescribed time-average electric field is 1 V/cm.

7. The method of claim 1, wherein the optimal placement of the implantable electrodes within the target tissue site further includes an insertion depth of the implantable electrodes.

8. A system for electric fields treatment of a target tissue site comprising: a generator for generating electrical field parameters, and at least one data processor, wherein the data processor, wherein the data processor includes instructions that when executed perform the following operations: (a) receiving, by the at least one data processor, data relating to a volume and one or more electric properties of the target tissue site, (b) using configurations of multiple electrodes implanted within the target tissue site, the volume and the one or more electric properties of the target tissue site, (c) using an optimization algorithm and the simulated electric field maps to: (i) determine an optimal number of implantable electrodes to treat the target tissue site with electrical field, the optimal number of implantable electrodes being one or more than one implantable electrodes, each electrode having one or more contacts, (ii) determine an optimal placement of the optimal number of implantable electrodes determined in (i) within the target tissue site, and (iii) determine optimal voltages and phase sifts of each of the one or more contacts of the optimal number of implantable electrodes at the optimal placement determined in (ii) that results in a prescribed time average electric field coverage of the entire target tissue site, wherein the electric field is a dynamically oriented electric filed, wherein the optimal placement of the optimal number of implantable electrodes within the target tissue site includes an insertion location and a trajectory angle of the optimal number of implantable electrodes, and (d) providing an output to treat the target tissue with electrotherapy by implanting into the target tissue the optimal number of implantable electrodes determined in step (c)(i) at the optimal placement determined in step (c)(ii) and using the optimal voltages and phase shifts of each of the contacts of the optimal number of implantable electrodes determined in step (c)(iii).

9. The system of claim 8, wherein operation (a) further comprises receiving data relating to volume and electric properties of tissue surrounding the target tissue site ("surrounding tissue"), operation (c) further comprises using the volume and the one or more electric properties of the surrounding tissue to determine (c)(i), (c)(ii) and (c)(iii) that results in a prescribed time average electric field coverage of the target tissue site while minimizes the volume of the surrounding tissue receiving the prescribed time average electric field.

10. The system of claim 8, wherein the operations further include (d) receiving data relating to one or more electric properties of the target tissue having information of an actual position of the implantable electrodes relative to the target tissue site, (e) using the data of (d) to assess the prescribed time average electric field coverage of the target tissue site, and (f) repeat steps (b) to (e) to optimize the prescribed time average electric field coverage based on the assessment in (e).

11. The system of claim 8, wherein the optimal placement of the optimal number of implantable electrodes within the target tissue further includes an insertion depth of the optimal number of implantable electrodes determined in step (c)(i).

12. A non-transitory computer readable storage medium, wherein code embodied in the computer readable storage medium executed by at least one processor performs operations, the operations including: (a) receiving, by at least one data processor, data relating to a volume and one or more electric properties of a target tissue site, (b) generating simulated electric field maps of the target tissue site using configurations of multiple electrodes implanted within the target tissue site, the volume and the one or more electric properties of the target tissue site, (c) using an optimization algorithm and the simulated electric field maps to: (i) determine an optimal number of implantable electrodes to treat the target tissue site with electric fields, the optimal number of implantable electrodes being one or more than one implantable electrodes, each implantable electrode having one or more contacts, (ii) determine an optimal placement of the optimal number of implantable electrodes determined in (i) within the target tissue site, and (iii) determine optimal voltages and phase sifts of each of the one or more contacts of the optimal number of implantable electrodes at the optimal placement determined in (ii) that results in a prescribed time average electric field coverage of the entire target tissue site, wherein the electric field is a dynamically oriented electric filed, wherein the optimal placement of the optimal number of implantable electrodes within the target tissue site includes an insertion location and a trajectory angle of the optimal number of implantable electrodes, and (d) providing an output to treat the target tissue with electrotherapy by implanting into the target tissue the optimal number of implantable electrodes determined in step (c)(i) at the optimal placement determined in step (c)(ii) and using the optimal voltages and phase shifts of each of the contacts of the optimal number of implantable electrodes determined in step (c)(iii).

13. The non-transitory computer readable storage medium of claim 12, wherein operation (a) further comprises receiving data relating to volume and one or more electric properties of tissue surrounding the target tissue site ("surrounding tissue"), operation (c) further comprises using the volume and the one or more electric properties of the surrounding tissue to determine (i), (ii) and (iii) that results in the prescribed time average electric field coverage of the target tissue site while minimizes the volume of the surrounding tissue receiving the prescribed time average electric field.

14. The non-transitory computer readable storage medium of claim 12, wherein the operations further include (d) receiving data relating to one or more electric properties of the target tissue having information of an actual position of the implantable electrodes relative to the target tissue site, (e) using the data of (d) to assess the prescribed time average electric field coverage of the target tissue site, and (f) repeat steps (b) to (e) to optimize the prescribed time average electric field coverage based on the assessment in (e).

15. The non-transitory computer readable storage medium of claim 12, wherein the optimal placement of the optimal number of implantable electrodes within the target tissue further includes an insertion depth of the optimal number of implantable electrodes determined in step (c)(i).

* * * * *